(12) United States Patent
Murakami

(10) Patent No.: US 9,715,766 B2
(45) Date of Patent: Jul. 25, 2017

(54) SYSTEM AND METHOD FOR CONTROLLING A DISPLAY

(71) Applicant: FUJITSU LIMITED, Kawasaki-shi, Kanagawa (JP)

(72) Inventor: Iori Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/575,272

(22) Filed: Dec. 18, 2014

(65) Prior Publication Data

US 2015/0206352 A1   Jul. 23, 2015

(30) Foreign Application Priority Data

Jan. 23, 2014   (JP) .................... 2014-010426

(51) Int. Cl.
*G06T 19/00* (2011.01)
*G06F 3/147* (2006.01)
*G06K 9/00* (2006.01)
*G06T 7/70* (2017.01)

(52) U.S. Cl.
CPC ............ *G06T 19/006* (2013.01); *G06F 3/147* (2013.01); *G06K 9/00671* (2013.01); *G06T 7/70* (2017.01); *G09G 2340/125* (2013.01); *G09G 2354/00* (2013.01); *G09G 2356/00* (2013.01)

(58) Field of Classification Search
None
See application file for complete search history.

(56) References Cited

U.S. PATENT DOCUMENTS

| | | | |
|---|---|---|---|
| 2004/0046779 | A1 | 3/2004 | Asano et al. |
| 2006/0050069 | A1 | 3/2006 | Okuno et al. |
| 2009/0216446 | A1 | 8/2009 | Ma et al. |

(Continued)

FOREIGN PATENT DOCUMENTS

| | | |
|---|---|---|
| JP | 2002-092647 | 3/2002 |
| JP | 2004-048674 | 2/2004 |

(Continued)

OTHER PUBLICATIONS

Henderson, Steven J., and Steven Feiner. "Evaluating the benefits of augmented reality for task localization in maintenance of an armored personnel carrier turret." Mixed and Augmented Reality, 2009. ISMAR 2009. 8th IEEE International Symposium on. IEEE, 2009.*

(Continued)

*Primary Examiner* — Ryan M Gray
(74) *Attorney, Agent, or Firm* — Oblon, McClelland, Maier & Neustadt, L.L.P.

(57) ABSTRACT

A system includes circuitry configured to acquire image data captured by an electronic device, acquire content and display position information corresponding to the content based on an object detected in the image data, the display position information indicating a display position of the content in relation to the object, determine whether the content is capable of being displayed in a superimposed manner on the image data at the display position indicated by the display position information, and indicate an alert to be output by the electronic device when it is determined that the content is unable to be displayed at the position indicated by the display position information.

19 Claims, 25 Drawing Sheets

(56) References Cited

U.S. PATENT DOCUMENTS

| | | | |
|---|---|---|---|
| 2012/0079426 A1 | 3/2012 | Jin et al. | |
| 2012/0250940 A1 | 10/2012 | Kasahara | |
| 2012/0287152 A1 | 11/2012 | Kunigita et al. | |
| 2012/0296564 A1 | 11/2012 | Ma et al. | |
| 2014/0225919 A1* | 8/2014 | Kaino | G06T 19/006 345/633 |
| 2014/0375683 A1 | 12/2014 | Salter et al. | |
| 2015/0039225 A1 | 2/2015 | Ma et al. | |
| 2015/0091780 A1 | 4/2015 | Lyren | |
| 2015/0145888 A1* | 5/2015 | Hanai | H04N 13/004 345/633 |
| 2015/0279105 A1* | 10/2015 | Hanai | G06F 1/1686 345/633 |

FOREIGN PATENT DOCUMENTS

| | | |
|---|---|---|
| JP | 2006-079174 | 3/2006 |
| JP | 2012-068984 | 4/2012 |
| JP | 2012-212345 | 11/2012 |
| JP | 2013-186005 A | 9/2013 |
| WO | WO 2013/187130 A1 | 12/2013 |

OTHER PUBLICATIONS

Office Action issued Jun. 1, 2015 in Australian Patent Application No. 2014277858.

Extended European Search Report issued Jun. 30, 2015 in European Application 14200058.7, filed on Dec. 23, 2014.

Steven J. Henderson et al. "Evaluating the Benefits of Augmented Reality for Task Localization in Maintenance of an Armored Personnel Carrier Turret", Retrieved from the Internet: URL:https://www.youtube.com/watch?v=mn-zvymlSvk, $10^{th}$ International Symposium on Mixed and Augmented Reality (ISMAR 2009), Sep. 10, 2009, XP054975919, 11 pages.

Dan Sung "Augmented Reality in Action—Maintenance and Repair", Retrieved from the Internet: URL:http://www.pocket-lint.com/news/108887-auqmented-reality-maintenance-and-repair, Pocket Lint, Mar. 1, 2011, XP055195811, 6 pages.

U.S. Office Action mailed Sep. 21, 2016 for U.S. Appl. No. 14/645,524.

Office Action issued May 17, 2017 in Chinese Patent Application No. 201510013200.5 (with English translation).

* cited by examiner

FIG. 3

$$T = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 11

| AR CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| C1 | Xm1 | Ym1 | Zm1 | Pm1 | Qm1 | Rm1 | Jx1 | Jy1 | Jz1 | T1 | M1 | CHECK TO SEE THAT VALVE IS CLOSED |
| C2 | Xm2 | Ym2 | Zm2 | Pm2 | Qm2 | Rm2 | Jx2 | Jy2 | Jz2 | T3 | M1 | |
| | | | | | | | | | | | | |

FIG. 12

| TEMPLATE ID | | T1 |
|---|---|---|
| VERTEX COORDINATES | 0 | (0, 0, 0) |
| | 1 | (X3m, Y3m, Z3m) |
| | 2 | (X4m, Y4m, Z4m) |
| | 3 | (X5m, Y5m, Z5m) |
| | 4 | (X6m, Y6m, Z6m) |
| | 5 | ... |
| | 6 | ... |
| | 7 | ... |
| | ... | ... |
| 1 | ORDER OF VERTICES | 1, 3, 4, 5, 7 |
| | TEXTURE ID | 21 |
| 2 | ORDER OF VERTICES | 2, 3, 4, 5, 6 |
| | TEXTURE ID | 21 |
| ... | ORDER OF VERTICES | ... |
| | TEXTURE ID | ... |

FIG. 20

$$R_X = \begin{bmatrix} 1 & 0 & 0 & 0 \\ 0 & \cos P1c & -\sin P1c & 0 \\ 0 & \sin P1c & \cos P1c & 0 \\ 0 & 0 & 0 & 1 \end{bmatrix}$$

$$R_Y = \begin{bmatrix} \cos Q1c & 0 & \sin Q1c & 0 \\ 0 & 1 & 0 & 0 \\ -\sin Q1c & 0 & \cos Q1c & 0 \\ 0 & 0 & 0 & 1 \end{bmatrix}$$

$$R_Z = \begin{bmatrix} \cos R1c & -\sin R1c & 0 & 0 \\ \sin R1c & \cos R1c & 0 & 0 \\ 0 & 0 & 1 & 0 \\ 0 & 0 & 0 & 1 \end{bmatrix}$$

$$T_L = \begin{bmatrix} 1 & 0 & 0 & 0 \\ 0 & 1 & 0 & 0 \\ 0 & 0 & 1 & 0 \\ L & L & L & 1 \end{bmatrix}$$

SYSTEM AND METHOD FOR CONTROLLING A DISPLAY

CROSS-REFERENCE TO RELATED APPLICATION

This application is based upon and claims the benefit of priority from the prior Japanese Patent Application No. 2014-010426, filed on Jan. 23, 2014, the entire contents of which are incorporated herein by reference.

FIELD

The embodiments discussed herein are related to techniques for displaying image data in such a manner that another image data is overlaid on the image data.

BACKGROUND

Augmented reality (AR) technology is known in which when an image of a real-world object is displayed on a display, a content that does not exist in the real world is displayed in such a manner as to be overlaid on the image displayed on the display, so that a combined image in which the content appears as if it existed in the real world is provided. Hereinafter, this content is referred to as an "AR content". It is possible for a user who views a combined image to acquire information displayed as an AR content and to catch more information than when the user directly views and recognizes the real world. Note that an AR content is sometimes image data that itself suggests a distinctive meaning by using its shape and color, and is sometimes image data including text data.

AR includes technologies called location-based AR and technologies called vision-based AR. The former acquires position information and information on bearings of a camera-equipped terminal from a global positioning system (GPS) sensor or the like and, in accordance with the position information and the bearing information, determines details of an AR content to be displayed in such a manner as to be overlaid and a position at which the AR content is to be displayed in such a manner.

The latter performs object recognition and space perception on image data acquired from a camera. Upon recognizing that image data is data of an image in which a specific object is captured, the vision-based AR displays an AR content corresponding to this specific object in such a manner as to be overlaid according to a space perception result (for example, Japanese Laid-open Patent Publication No. 2002-092647 and Japanese Laid-open Patent Publication No. 2004-048674). Note that AR in which a marker is an object to be recognized is sometimes referred to as "marker vision-based AR", and AR in which an object other than a marker is an object to be recognized is sometimes referred to as "marker-less vision-based AR".

Additionally, a technology is known in which, in a game machine including a vision-based AR function, when an imaging device included in the game machine captures an image of a marker, a selection object for menu selection is displayed on a display of the game machine (for example, Japanese Laid-open Patent Publication No. 2012-068984). Further, when the user tilts the game machine, and, as a result, the imaging direction of the imaging device crosses a collision region of the selection object, the game machine determines that the selection object has been selected.

SUMMARY

According to an aspect of the invention, a system includes circuitry configured to acquire image data captured by an electronic device, acquire content and display position information corresponding to the content based on an object detected in the image data, the display position information indicating a display position of the content in relation to the object, determine whether the content is capable of being displayed in a superimposed manner on the image data at the display position indicated by the display position information, and indicate an alert to be output by the electronic device when it is determined that the content is unable to be displayed at the position indicated by the display position information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts a transformation matrix T from the marker coordinate system to the camera coordinate system, and a rotation matrix R in the transformation matrix T;

FIG. 4 depicts rotation matrices R1, R2, and R3;

FIG. 11 illustrates an example of a configuration of a data table that stores AR content information;

FIG. 12 illustrates an example of a configuration of a data table that stores template information;

FIG. 20 depicts determinants used in Formula 3;

DESCRIPTION OF EMBODIMENTS

A computer equipped with vision-based AR technology performs object recognition processing on image data. If a specific object is recognized, the computer performs a display control process for displaying an AR content in such a manner as to be overlaid manner on the image data. In the display control process, the computer estimates the positional relationship between an object to be recognized and a camera by performing object recognition and space perception on image data acquired from the camera. For an AR content, the positional relationship (arrangement position and arrangement attitude) relative to an object to be recognized is determined in advance. The positional relationship between the camera and the AR content is therefore determined by using the above-estimated positional relationship between the camera and the AR content.

Here, according to the related art, when the display control process is performed given that an image in which a specific object appears is an object to be recognized, an AR content to be normally displayed in an overlaid manner so as to correspond to the specific object is not displayed in some cases. One example of this is a system that offers support for work by displaying, in an AR manner, an AR content indicating work specifics. A worker who utilizes this system recognizes an AR content that gives an instruction on work specifics, in a combined image displayed on a display, and the worker carries out the work specifics as instructed. However, if the AR content is not displayed in the combined image displayed on the display, it is of course impossible for the worker to acquire information of the AR content. That is, it is impossible for the worker to realize that the worker has to carry out the work on which the instruction is given through the AR content.

Accordingly, it is an object of the present disclosure to determine whether, in AR technology, an AR content is actually displayed on a display and to report the existence of an AR content that is not displayed on the display.

Hereinafter, detailed embodiments of the present disclosure will be described. It is to be noted that embodiments described below may be combined appropriately as long as no contradictions arise among processing details.

To begin with, the vision-based AR technology will be described. Note that, in particular, an example of marker vision-based AR that uses markers will be given below. However, technologies disclosed in the embodiments may be applied to marker-less vision-based AR. In this case, in object recognition processing, a dictionary defining the shapes of objects to be recognized is prepared in advance. By using the dictionary, object recognition processing is performed on image data.

Figure 1:
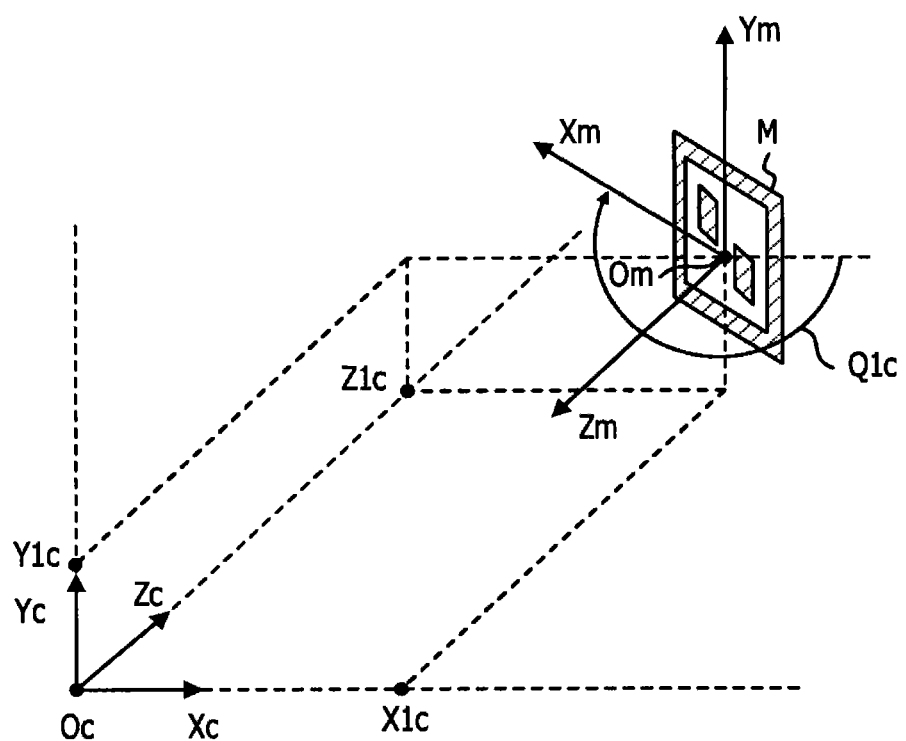
FIG. 1 illustrates the relationship between a camera coordinate system and a marker coordinate system.

Initially, the relationship between a camera coordinate system centering on a camera and a marker coordinate system centering on a marker is described. FIG. 1 is a diagram illustrating the relationship between a camera coordinate system and a marker coordinate system. Note that the marker is, for example, a pattern having a unique shape printed on paper attached to the wall, ceiling, equipment, or the like in a building. In the marker vision-based AR, the recognition target is a marker, and thus a marker is recognized when specific image data indicating a shape unique to the marker is included in image data.

In FIG. 1, the origin of the camera coordinate system is Oc (0, 0, 0). The camera coordinate system includes three dimensions (Xc, Yc, Zc). The Xc-Yc plane of the camera coordinate system is a face parallel to the face of an imaging device of the camera. The Zc axis is an axis perpendicular to the face of the imaging device. Not that the origin Oc may be the focus of an actual camera, or may be set to a position at a predetermined distance from the focus of the camera in the Zc direction.

Next, as illustrated in FIG. 1, the origin of the marker coordinate system is Om (0, 0, 0). Note that the origin Om is the center of a marker M. The marker coordinate system includes three dimensions (Xm, Ym, Zm). For example, an Xm-Ym plane of the marker coordinate system is a face parallel to the marker M, and a Zm axis is perpendicular to the face of the marker M. Note that, in the marker coordinate system, the size corresponding to one marker in image data is assumed as a unit coordinate.

In contrast, it is assumed that the origin Om of the marker coordinate system is represented by $(X1c, Y1c, Z1c)$ in the camera coordinate system. The coordinates $(X1c, Y1c, Z1c)$ of Om in the camera coordinate system are calculated by performing object recognition and space perception on image data acquired from a camera.

Here, in order to perform object recognition and space perception, a shape with which the relationship between a marker and a camera can be identified is adopted as the shape of the marker. The size of the marker is also decided in advance. Thus, a marker may be recognized by performing object recognition on image data, and the positional relationship of the marker relative to a camera may be determined from the shape and the size of the figure of the marker in the image data. For example, the marker M has a square shape with each side thereof being 5 cm long.

Additionally, the angle of rotation of the marker coordinate system (Xm, Ym, Zm) relative to the camera coordinate system (Xc, Yc, Zc) is represented by rotational coordinates $G1c$ $(P1c, Q1c, R1c)$. $P1c$ is the angle of rotation about the Xc axis, $Q1c$ is the angle of rotation about the Yc axis, and $R1c$ is the angle of rotation about the Zc axis. The marker coordinate system illustrated in FIG. 1 rotates only about the Ym axis, and therefore $P1c$ and $R1c$ are zero. Note that each angle of rotation is calculated based on a comparison between a known marker shape and the shape of the figure of a marker in a captured image.

Figure 2:
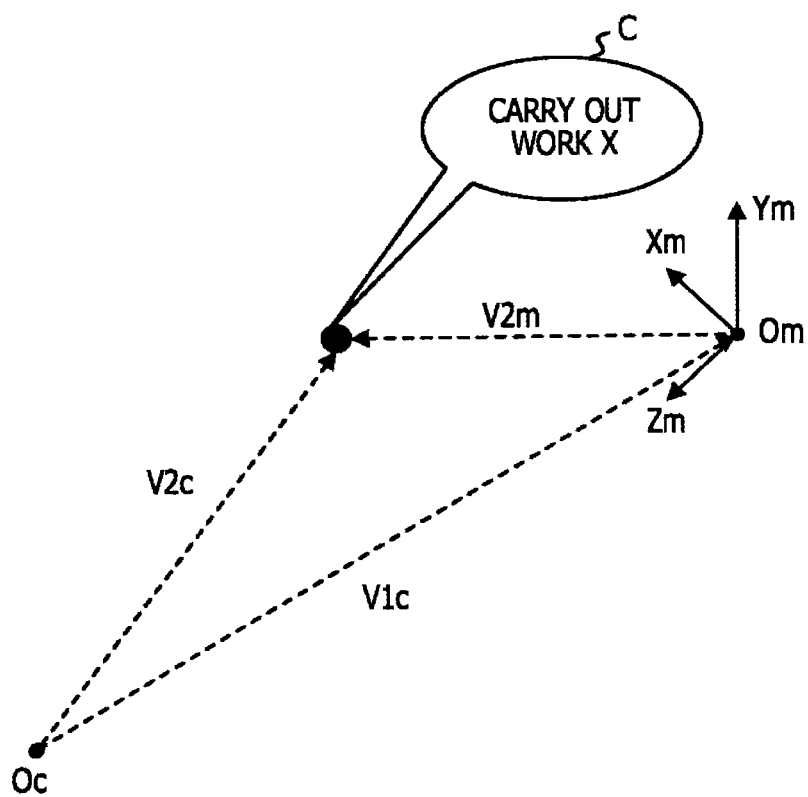
FIG. 2 illustrates an example of an AR content.

FIG. 2 illustrates an example of an AR content. An AR content C illustrated in FIG. 2 is image data having a speech-bubble shape, and contains text information "Carry out work X" in the speech bubble. Additionally, position information and rotation information relative to the marker are set in advance for the AR content C. That is, the position information and the rotation information of an AR content in the marker coordinate system are set.

Here, the position information and the rotation information are described in detail. A black circle at the tip of the speech bubble of the AR content C indicates a reference point $V2m$ $(X2m, Y2m, Z2m)$ for the AR content C. Additionally, the attitude of the AR content C is defined by rotational coordinates $G2m$ $(P2m, Q2m, R2m)$, and the size of the AR content C is defined by a magnification factor D $(Jx, Jy, Jz)$. Note that the rotational coordinates $G2m$ of the AR content C indicate how much the AR content is rotated relative to the marker coordinate system when the AR content is arranged. For example, in the case where $G2m$ is (0, 0, 0), which is different from the example of FIG. 2, an AR content is displayed in an AR manner in parallel with the marker.

Next, the coordinates of points forming the AR content C, in addition to the reference point, are individually set, and thereby the shape of the AR content C is set. In this embodiment, description is given assuming that a template created in advance is also used for the shape of the AR content C. That is, the coordinates of points that form the AR content C are defined in a template that is a model for making the shape of the AR content C. In the template, however, the reference point has coordinates (0, 0, 0), and each point other than the reference point is defined as values relative to the coordinates of the reference point. Consequently, when the reference point V2m of the AR content C is set, the coordinates of each point forming the template are subjected to translation based on the coordinates V2m.

The coordinates of each point included in the template are further subjected to rotation based on the set rotational coordinates G2m, and the distances between adjacent points are expanded or contracted by the magnification factor D. That is, the AR content C of FIG. 2 indicates a state where the AR content C is formed based on points obtained by adjusting all the points defined in the template, based on the coordinates V2m of the reference point, the rotational coordinates G2m, and the magnification factor D.

As described above, arrangement of an AR content relative to a marker is determined based on the position information and the rotation information of the AR content. Consequently, once a user has taken a photograph of a marker with a camera, a computer generates image data representing the figure of an AR content assuming that the camera took a photograph of the AR content with an arrangement determined relative to the marker. In the process of generating image data representing the figure of an AR content, processing in which coordinates of each of points defined in the marker coordinate system are transformed to those in the camera coordinate system and processing in which each point transformed in the camera coordinate system is projected on a display plane for drawing the point on the display are performed. Further, the image data representing the figure of an AR content is drawn on top of image data acquired from the camera, and thus the AR content is displayed in such a manner as to be overlaid on the image data. Each processing is described below.

First, FIG. 3 depicts a transformation matrix T from the marker coordinate system to the camera coordinate system, and a rotation matrix R. The transformation matrix T is a determinant for transforming each point in the AR content defined in the marker coordinate system from the marker coordinate system to the camera coordinate system, based on coordinate values (X1c, Y1c, Z1c) in the camera coordinate system of Om, which is the origin of the marker coordinate system, and the rotational coordinates G1c (P1c, Q1c, R1c) of the marker coordinate system relative to the camera coordinate system.

The transformation matrix T is a 4×4 matrix. By the product of the transformation matrix T and the column vector (Xm, Ym, Zm, 1) for the coordinates Vm of the marker coordinate system, a column vector (Xc, Yc, Zc, 1) for the corresponding coordinates Vc of the camera coordinate system is obtained.

A submatrix (the rotation matrix R) with first to third rows and first to third columns of the transformation matrix H acts on the coordinates of the marker coordinate system, thereby performing a rotation operation for aligning the orientation of the marker coordinate system with the orientation of the camera coordinate system. A submatrix with the first to third rows and a fourth column of the transformation matrix M acts, thereby performing a translation operation for causing the position of the marker coordinate system to coincide with the position of the camera coordinate system.

FIG. 4 depicts rotation matrices R1, R2, and R3. Note that the rotation matrix R depicted in FIG. 3 is calculated by the product (R1·R2·R3) of the rotation matrices R1, R2, and R3. In addition, the rotation matrix R1 represents the rotation of an Xm axis relative to the Xc axis. The rotation matrix R2 represents the rotation of the Ym axis relative to the Yc axis. The rotation matrix R3 represents the rotation of the Zm axis relative to the Zc axis.

The rotation matrices R1, R2, and R3 are generated based on the figure of the marker in the captured image. That is, the angles of rotation P1c, Q1c, and R1c are calculated based on what figure is captured as the marker having a known shape, in a captured image to be processed, as described above. Based on the calculated angles of rotation P1c, Q1c, and R1c, the rotation matrices R1, R2, and R3 are generated.

As described above, by substituting point coordinates of the marker coordinate system to be coordinate transformed for the column vector (Xm, Ym, Zm, 1) and then performing a matrix operation, the column vector (Xc, Yc, Zc, 1) including the point coordinates of the camera coordinate system is obtained. That is, the point (Xm, Ym, Zm) of the marker coordinate system may be transformed to that (Xc, Yc, Zc) of the camera coordinate system. Note that coordinate transformation is also referred to as model-view transformation.

For example, as illustrated in FIG. 2, model-view transformation is performed on the reference point V2m of the AR content C, and thus it is determined that the reference point V2m defined in the marker coordinate system corresponds to what point in the camera coordinate system. Through the processing that has been described, the position of an AR content relative to a camera (the position relationship between the camera and the AR content) may be calculated by utilizing a marker.

Next, the coordinates of the camera coordinate system of each point of the AR content C are transformed into those of a screen coordinate system. The screen coordinate system is composed of two dimensions (Xs, Ys). Then, the coordinates of each point of the AR content, which have been transformed in the coordinates of the camera coordinate system, are projected on a two-dimensional plane (Xs, Ys) serving as a virtual screen, and thus the figure of the AR content C to be displayed in an AR manner is generated. That is, part of the screen coordinate system corresponds to the display screen of a display. Note that transforming the coordinates of the camera coordinate system into those of the screen coordinate system is referred to as "perspective transformation".

Here, the virtual screen serving as a plane of projection is set, for example, in parallel with the Xc-Yc plane of the camera coordinate system and at a predetermined distance therefrom in the Zc direction. At this point, when the origin Oc (0, 0, 0) in the camera coordinate system is set at a certain distance from the focus of a camera in the Zc direction, the origin (0, 0) in the screen coordinate system also corresponds to one point on the optical axis of the camera.

The perspective transformation is performed, for example, based on a focal distance f of the camera. The Xs coordinate of coordinates of the screen coordinate system corresponding to the coordinates (Xc, Yc, Zc) in the camera coordinate system is determined by Formula 1 given below. The Ys coordinate of coordinates of the screen coordinate system corresponding to the coordinates (Xc, Yc, Zc) in the camera coordinate system is determined by Formula 2 given below. Xs=f·Xc/Zc (Formula 1), Ys=f·Yc/Zc (Formula 2)

The figure of the AR content C is generated based on the coordinate values of the screen coordinate system obtained by the perspective transformation. The AR content C is generated by mapping textures onto faces acquired by interpolating a plurality of points constituting the AR content C. In the template from which the AR content C originates, it is defined which point be interpolated to form a face and which texture be mapped onto which face.

As described above, the coordinates of each point forming the AR content C are transformed from the marker coordinate system to the camera coordinate system, and further to the screen coordinate system. Thereafter, processing of drawing on a display is performed using the coordinates (the screen coordinate system) of each of points of the AR content C. The figure of the AR content C that exists at a position beyond the displayable range of the display is of course not included in an image displayed on the display. The inventors found that even though a marker was recognized from image data acquired from the camera, the figure of the AR content C whose arrangement relative to the marker was specified was sometimes not displayed in such a manner as to be overlaid in a combined image displayed on the display.

Figure 5:
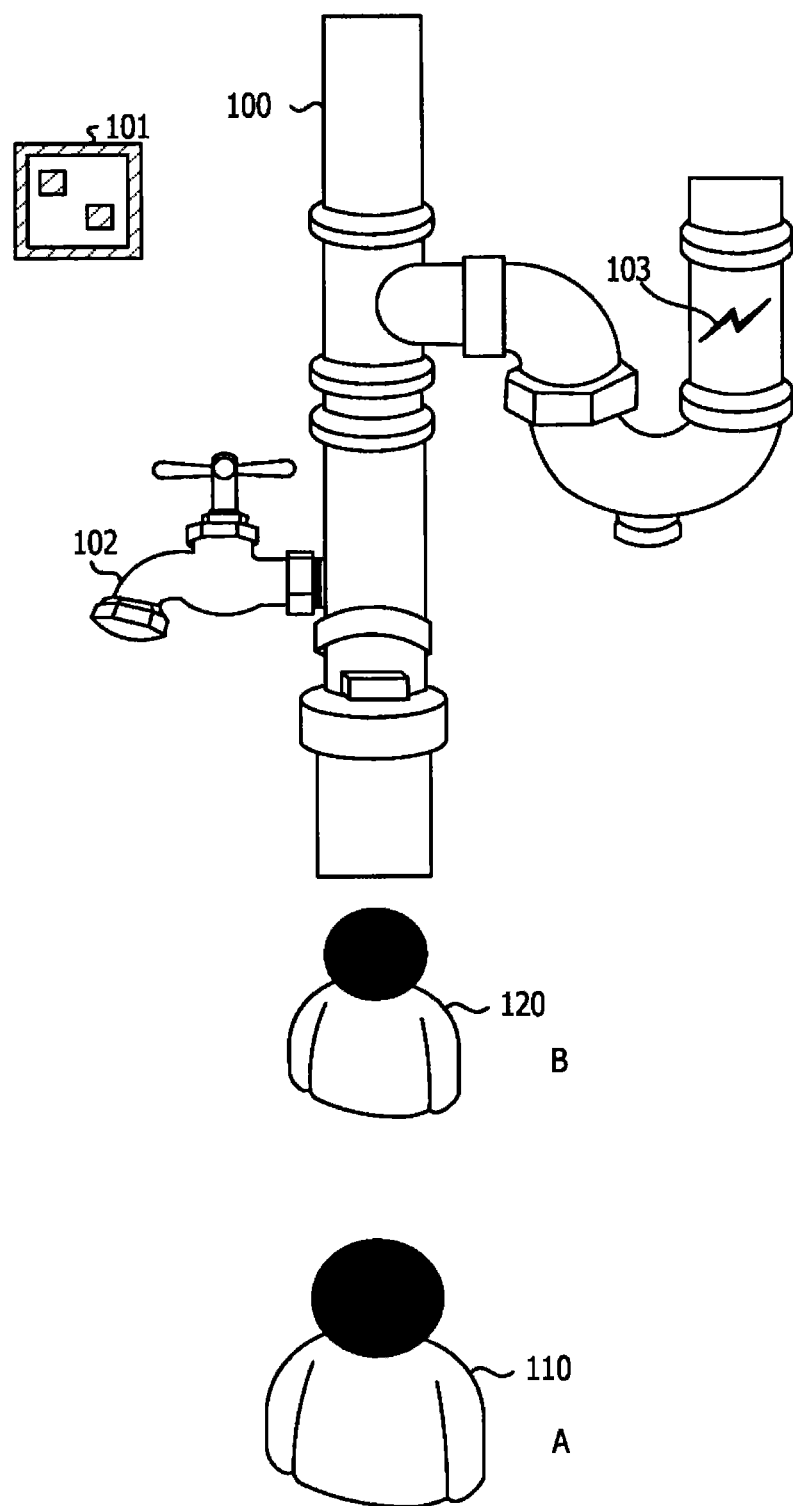
FIG. 5 is a conceptual illustration of the real world seen from one viewpoint.

With reference to FIG. 5, FIG. 6, FIG. 7, and FIG. 8, the case where the image of the AR content C is not displayed in such a manner as to be overlaid on an image displayed on a display will be described. FIG. 5 is a conceptual illustration of the real world seen from one viewpoint. In FIG. 5, a valve 102 is attached to a pipe 100, and further a crack 103 exists in the pipe 100. Additionally, a marker 101 is attached on a wall behind the pipe 100. Additionally, from a position A, a user 110 takes a photograph of this real world, by using a camera, so that the photograph depicts the marker 101. From a position B, a user 120 takes a photograph of this real world, by using a camera, so that the photograph depicts the marker 101. Note that the position A of the user 110 is more distant from the marker 101 than the position B of the user 120.

Figure 6:
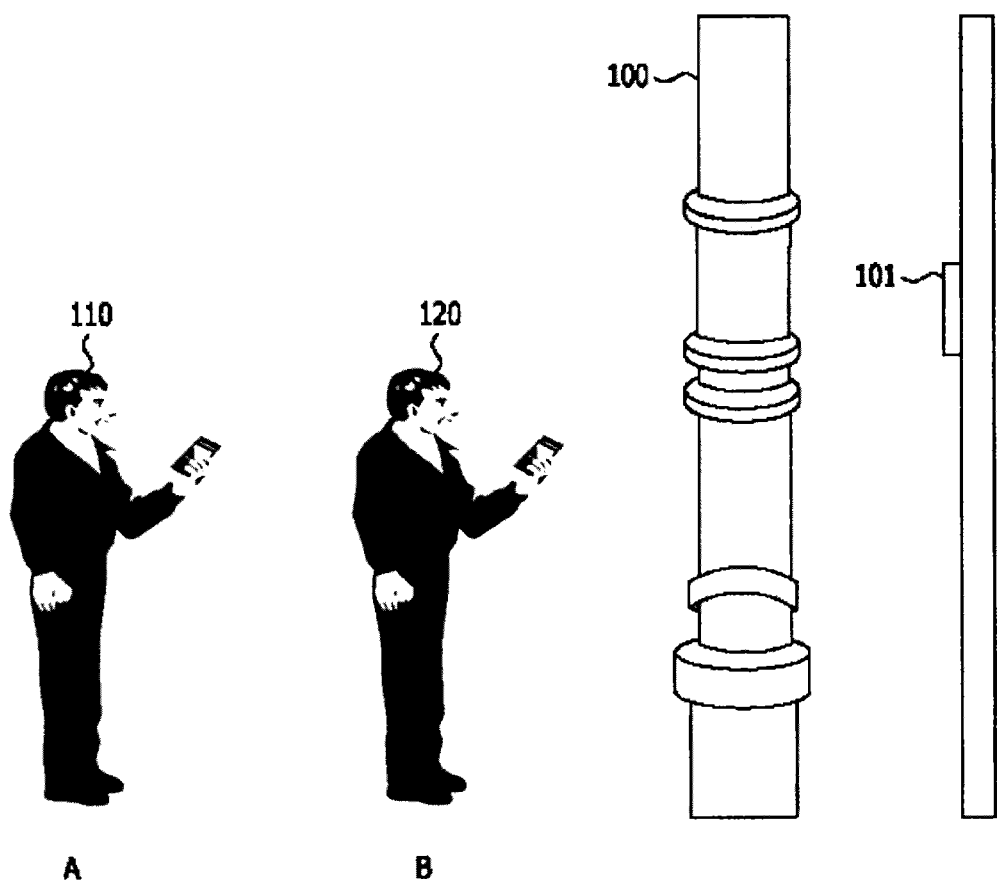
FIG. 6 is a conceptual illustration of the real world seen from another viewpoint.

FIG. 6 is a conceptual illustration of the real world seen from another viewpoint. The pipe 100 in FIG. 6 is the same object as the pipe 100 in FIG. 5, and the marker 101 of FIG. 6 is also the same as the marker 101 of FIG. 5. Note that, in FIG. 6, the valve 102 and the crack 103 are omitted. As illustrated in FIG. 6, the user 120 takes a photograph of the marker 101 from a position closer to the marker 101 than the position of the user 110.

Figure 7:
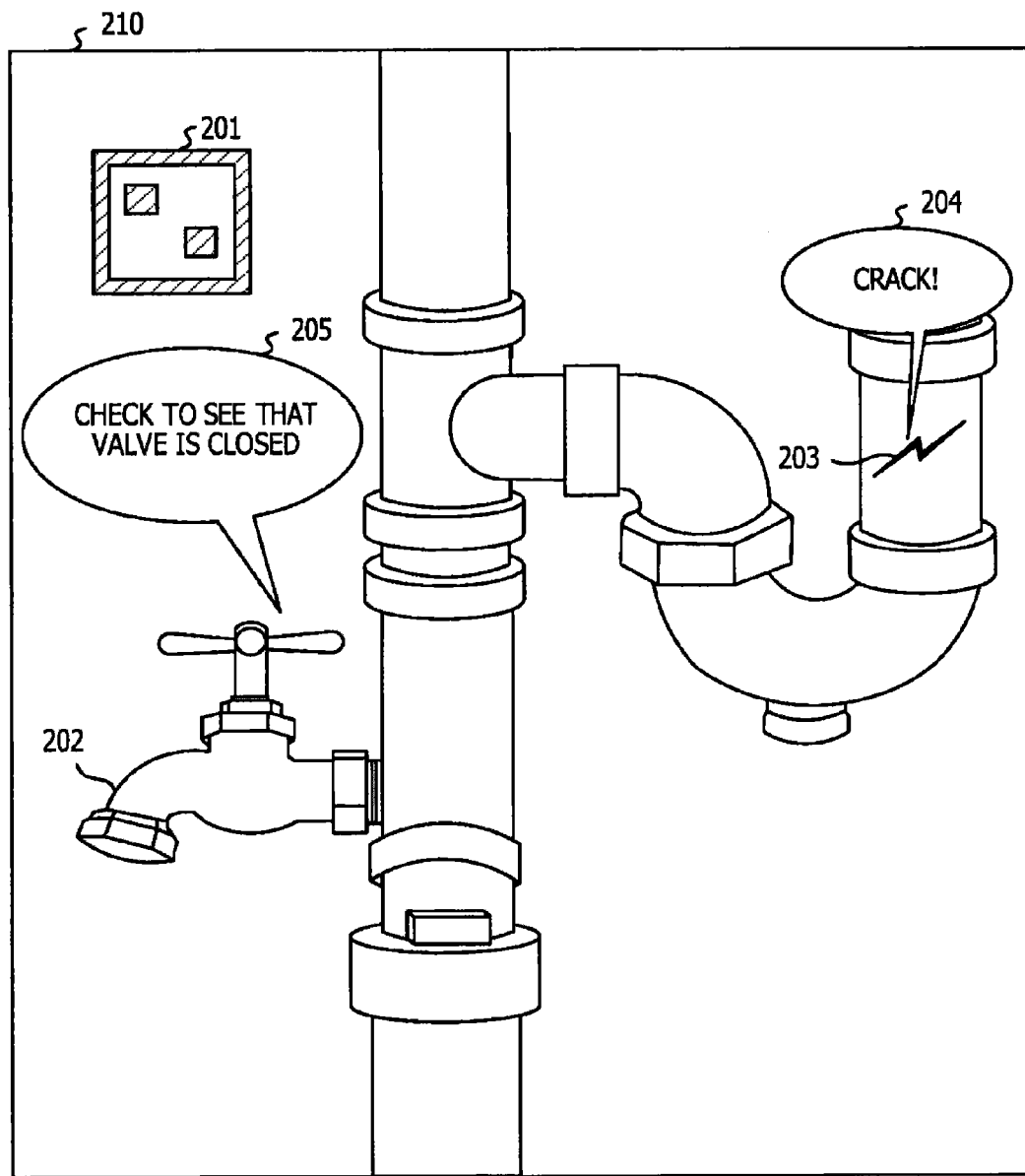
FIG. 7 is a conceptual illustration of AR display based on an image captured by a user 110.
Figure 8:
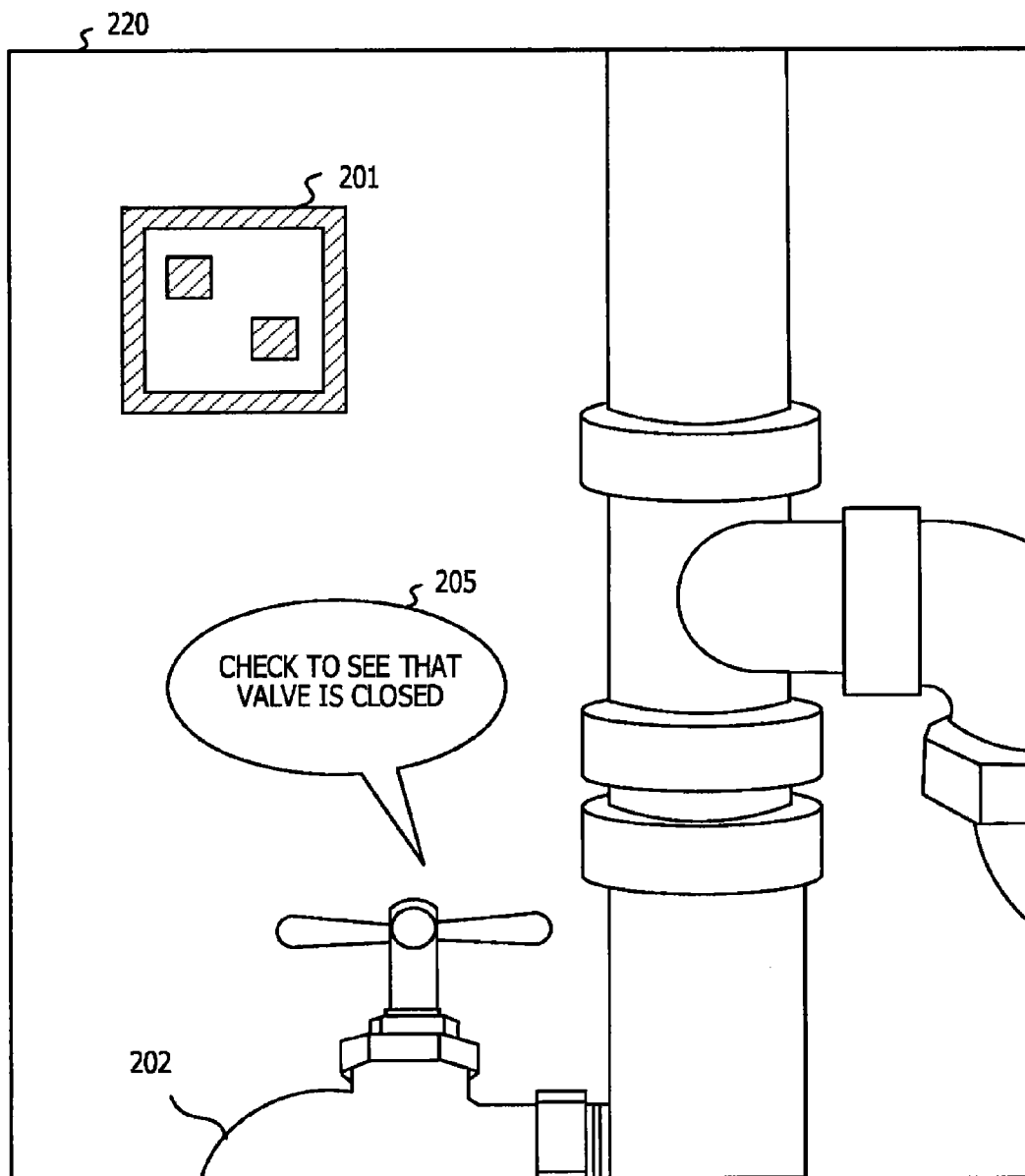
FIG. 8 is a conceptual illustration of AR display based on an image captured by a user 120.

FIG. 7 is a conceptual illustration of AR display based on an image captured by the user 110. FIG. 8 is a conceptual illustration of AR display based on an image captured by the user 120. As illustrated in FIG. 7, in a combined image 210 in which AR display is performed on an image captured from the position A, an AR content 204 and an AR content 205 are displayed in such a manner as to be overlaid. Consequently, it is possible for the user 110 to carry out work (checking for a crack) related to the AR content 204 and work related to the AR content 205.

In contrast, as illustrated in FIG. 8, in a combined image 220 in which AR display is performed on an image captured from the position B, the AR content 205 is displayed in such a manner as to be overlaid on the captured image, but the AR content 204 is not displayed in such a manner as to be overlaid. Consequently, it is impossible for the user 120 to carry out work (checking for a crack) related to the AR content 204. Note that, although FIG. 8 illustrates a processing result (comparative example) in the related art, displaying as illustrated in FIG. 8 may be performed in embodiments described below. In the following embodiments, when the combined image 220 as illustrated in FIG. 8 is generated, the existence of the content 204 is reported to the user.

Here, in order to avoid a situation as illustrated in FIG. 8, it is considered that when a user grasps in advance that an AR content is to be displayed in such a manner as to be overlaid on a pipe, the user may capture an image at a position (for example, the position A) that allows the user to capture the entire pipe. In the actual real space, however, other objects such as a variety of equipment exist in addition to the pipe, and thus there is a possibility that the AR content might be displayed in such a manner as to be overlaid on other objects. Consequently, it is difficult for a user to suitably adjust the position of photographing unless the user grasps all the objects on which an AR content might be displayed in such a manner as to be overlaid.

Additionally, when no AR content is included in a combined image displayed on a display although a user has taken a photograph of the marker 101, the user may voluntarily adjust the position of photographing. However, since, as illustrated in FIG. 6, a plurality of AR contents are associated with a single marker in some cases, it is impossible for a user to determine how many AR contents have to be displayed in such a manner as to be overlaid in order to achieve a state where all the AR contents are displayed in such a manner as to be overlaid.

Further, even among images in which the same marker is captured, details of an AR content to be displayed and the presence or absence of overlay display of an AR content are changed in some cases in accordance with the user's attribute. In some of these cases, for example, even though a user X takes a photograph of a marker, no AR content is displayed in such a manner as to be overlaid in a combined image. Consequently, it is impossible for the user X to grasp whether no AR content to be displayed in such a manner as to be overlaid exists from the beginning, or an AR content is not displayed in such a manner as to be overlaid because of the position of photographing.

Accordingly, when specific image data (image data of a marker) is included in image data to be displayed on a display device (display), in an AR display method for displaying another image data (the figure of an AR content) corresponding to the specific image data in an overlaid manner on the image data, a computer determines, based on the display position of the specific image data displayed on the display device, whether the other image data is able to be displayed in a manner as to be overlaid at a position determined in advance for the specific image data, and provides a report if it is determined that the other image data is unable to be displayed.

Although described in detail below, in a first embodiment, a computer determines, using coordinate values of the screen coordinate system of the AR content C, whether the projection position of the figure of the AR content C is within a displayable range of the display. Additionally, in a second embodiment, the computer transforms the displayable range of the display to the range of the marker coordinate system, based on the figure of the marker in image data acquired from the camera, thereby determining, using position information of the marker coordinate system set in advance for the AR content C, whether the projection position is within a displayable range of the display.

Figure 9:
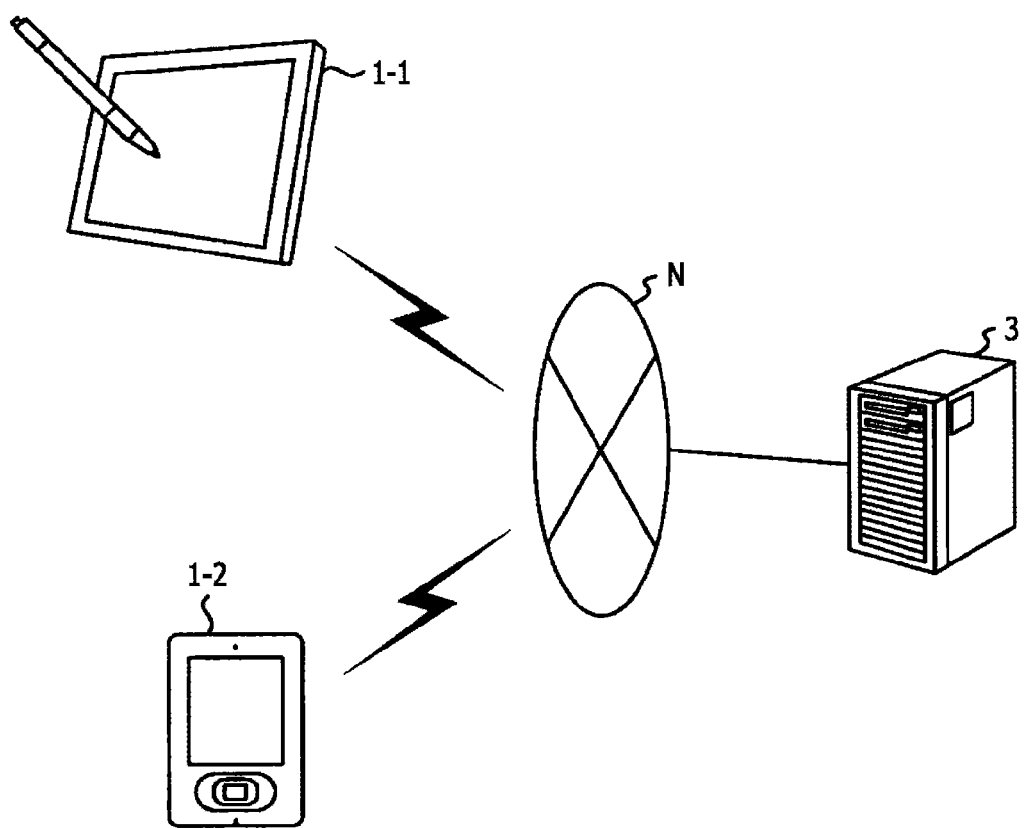
FIG. 9 is a system configuration diagram according to each embodiment.

Initially, portions common to the first embodiment and the second embodiment are described. FIG. 9 is a system configuration diagram according to each embodiment. In the example of FIG. 9, a communication terminal 1-1 and a communication terminal 1-2 are illustrated as examples of an information processing device that performs AR display. Hereinafter, these are generically referred to as information processing devices 1. Additionally, the information processing devices 1 communicate with a management device 3 over a network N.

The information processing device 1 is, for example, a computer having an imaging device, such as a tablet personal computer (PC) or a smartphone, which includes an imaging device such as a camera. The management device 3 is, for example, a server computer and manages the information processing devices 1. The network N is the Internet, for example. Note that the system according to these embodiments includes the information processing devices 1 and the management device 3.

The information processing device 1 generates combined image data including image data acquired from a camera and another image data (an AR content) overlaid on the acquired image data. At this point, when specific image data (a marker) is included in the image data acquired from the camera, the information processing device 1 displays the other image data (the AR content) in an overlaid manner in accordance with a position determined in advance for the marker. At this point, the information processing device 1 determines whether the AR content is able to be displayed in such a manner as to be overlaid, and provides some report if the AR content is unable to be displayed in such a manner as to be overlaid. For example, when the information processing device 1 determines that an AR content unable to be displayed in such a manner as to be overlaid exists, the information processing device 1 displays a warning message on a display or outputs a warning sound.

In contrast, the management device 3 stores AR content information and template information and offers them to the information processing device 1 as an occasion arises. The AR content information is information related to an AR content of an object to be displayed in an AR manner. The template information is information by which the shape, the pattern, and the like of a template are defined when an AR content is generated by using the template. Details thereof will be described below.

The information processing device 1 acquires AR content information and template information from the management device 3 before performing AR display. Note that although the management device 3 stores AR content information related to a plurality of AR contents and template information related to a plurality of templates, the management device 3 may provide only AR content information and template information related to some of the plurality of AR content or some of the templates to the information processing device 1. For example, in accordance with the attributes of a user who operates the information processing device 1, the management device 3 provides only AR content that is likely to be provided to the user and a template related to the AR content to the information processing device 1.

The information processing device 1 may transmit image data to be processed to the management device 3, and combined image data related to AR display may be generated by the management device 3, and combined image data may be transmitted from the management device 3 to the information processing device 1.

First Embodiment

Figure 10:
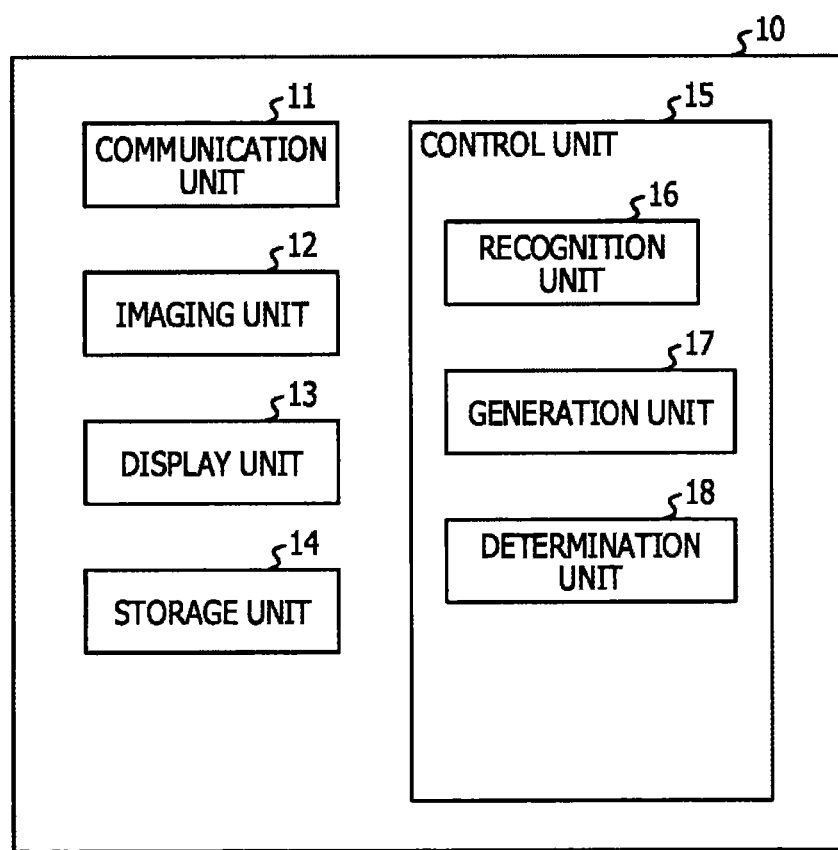
FIG. 10 is a functional block diagram of an information processing device 1.

Next, the functional configuration of the information processing device 1 according to the first embodiment will be described. FIG. 10 is a functional block diagram of an information processing device 10 according to the first embodiment. The information processing device 10 includes a communication unit 11, an imaging unit 12, a display unit 13, a storage unit 14, and a control unit 15. Note that an example of the above-mentioned information processing device 1 is the information processing device 10 in the first embodiment.

The communication unit 11 communicates with other computers. For example, the communication unit 11 receives AR content information and template information from the management device 3 in order to generate combined image data. The imaging unit 12 captures images at regular frame intervals and generates image data. Then, the imaging unit 12 inputs the image data to the control unit 15.

The display unit 13 displays a variety of image data acquired from the control unit 15. The variety of image data includes image data acquired by the imaging unit 12 acquired and combined image data generated by the control unit 15. The storage unit 14 stores a variety of information under control of the control unit 15. The storage unit 14 stores AR content information and template information. Note that the storage unit 14 may temporarily store image data acquired from the imaging unit 12.

The control unit 15 controls a variety of processing of the entire information processing device 1. As described below, the control unit 15 includes a recognition unit 16, a generation unit 17, and a determination unit 18. The recognition unit 16 performs object recognition of input image data. Specifically, by using a template for object recognition in which the shapes of markers are defined, the recognition unit 16 determines whether the image data of a marker is included in the input image data.

Additionally, having recognized that the image data of a marker is included in the input image data, the recognition unit 16 acquires identification information by which the marker is identified. For example, a marker identifier (ID) is acquired. For example, a unique marker ID is acquired from arrangement of white portions and black portions, likewise in the case of a two-dimensional bar code. Another known acquisition method may be applied as a method for acquiring a marker ID.

Having recognized that the image data of a marker is included in the input image data, the recognition unit 16 also calculates the position coordinates and the rotational coordinates of the marker, based on the image data of the marker. Note that the position and rotational coordinates of a marker are values in the camera coordinate system. The recognition unit 16 outputs the calculated position and rotational coordinates to the generation unit 17. Note that if it is determined that the image data of a marker is not included in the input image data, the recognition unit 16 outputs the result to the generation unit 17.

The generation unit 17 generates combined image data for performing AR display, based on AR content information and template information. Note that, during generation of combined image data, the position coordinates and rotational coordinates calculated by the recognition unit are utilized. The generation unit 17 also controls the display unit 13 for display of combined image data.

Here, for the purpose of explanation of processing performed by the generation unit 17, AR content information and template information are described. Note that AR content information and template information are stored in the storage unit 14.

FIG. 11 illustrates an example of a configuration of a data table that stores AR content information. The AR content information at least includes AR content IDs, position information, and rotation information. The AR content information may also include magnification information, template IDs, marker IDs, and additional information.

The AR content IDs and the position information and rotation information of AR contents in the marker coordinate system are stored in association with one another in the data table. The AR content ID is identification information that uniquely identifies an AR content. The position information is information for specifying the position of an AR content for a marker and, for example, is position coordinates (Xm, Ym, Zm) of a reference point that forms AR content in the marker coordinate system. The rotation information is information for specifying rotation of an AR content relative to a marker and, for example, is rotational coordinates (Pm, Qm, Rm) of AR content relative to the marker coordinate system.

Additionally, when the model shape of an AR content is created by using a template, a template ID and magnification information are stored in the data table. The template ID is identification information by which a template applied to an AR content is identified. The magnification information is information on the magnification factor D used when a template is applied as an AR content. For example, the magnification information is a magnification factor (Jx, Jy, Jz) for expansion or contraction in each axial direction.

Further, when an AR content for AR display is changed depending on identification information of the recognized marker, the marker IDs of markers with which respective AR contents are associated are stored in the data table. Note that when, even with the same marker, an AR content for AR display is changed depending on the user's attribute information, information for identifying the user's attribute for each AR content is stored together with the marker ID.

Additional information may be further stored in the data table. As additional information, for example, information on text drawn in an AR content is stored. In the example of the AR content ID "C1" of FIG. 11, text "Check to see that valve is closed" will be drawn in the AR content.

FIG. 12 illustrates an example of a configuration of a data table that stores template information. The template information includes identification information of a template (template ID), coordinate information of each vertex constituting the template, and configuration information (designation of the order of vertices and the texture ID) of each face constituting the template.

The order of vertices indicates the order of vertices constituting a face. The texture ID indicates the identification information of a texture mapped to the face. The reference point of a template is, for example, the 0th vertex. Using the information indicated in the template information table, the shape and pattern of a three-dimensional model are determined.

When generating combined image data, the generation unit 17 identifies the AR content ID of an AR content for display in an AR manner according to a marker ID acquired from the recognition unit 16. Then, utilizing the corresponding AR content information, the template information, and position and rotational coordinates calculated by the recognition unit 16, the generation unit 17 generates image data for overlaying of the AR content. The image data for overlaying is data corresponding to a figure that is obtained by arranging an AR content at a position specified in advance relative to a marker in a virtual space and projecting the AR content on a virtual screen. Then, the generation unit 17 combines the image data acquired from the camera and the image data for overlaying together, thereby generating combined image data.

For example, an AR content whose content ID illustrated in FIG. 11 is "C1" includes vertices obtained by expanding or contracting, in the Xm, Ym, and the Zm directions, the coordinates of each vertex defined in an AR template "T1" of FIG. 12, rotating them by using rotational coordinates (Pm1, Qm1, Rm1), and translating them in accordance with the position coordinates (Xm1, Ym1, Zm1).

The generation unit 17 performs coordinate transformation of the coordinates of each point of an AR content from the marker coordinate system to the camera coordinate system using AR content information, template information, and the transformation matrix T, as described above. Additionally, the generation unit 17 transforms the camera coordinate system to the screen coordinate system using the above-mentioned Formula 1 and Formula 2. Additionally, the generation unit 17 maps texture defined by the template information and additional information defined by AR content information on a face constituting the AR object, thereby generating the figure (image data) of the AR content for overlay displaying.

With reference to FIG. 10, based on the position determined in advance for the marker, the determination unit 18 determines whether an AR content is able to be displayed in such a manner as to be overlaid on image data acquired from a camera. Specifically, the determination unit 18 compares image data generated by the generation unit 17 with the displayable range of the display unit 13 (display). The display has a resolution of H×L. Note that "H" of the resolution is the number of pixels arranged in a direction corresponding to the vertical direction of display of FIG. 7 or the like, and the vertical direction of the display corresponds to the Ys direction of the screen coordinate system. "L" of the resolution is the number of pixels arranged in a direction corresponding to the horizontal direction of the display, and the horizontal direction of the display corresponds to the Xs direction of the screen coordinate system.

When the origin of the screen coordinate system is set on the optic axis of a camera, and display is performed under a condition that the center of the display coincides with the origin of the screen coordinate system, the determination unit 18 determines for each point forming an AR content whether the Xs coordinate value transformed in the screen coordinate system is in a range from −L/2 to +L/2, and further determines whether the Ys coordinate value is in a range from −H/2 to +H/2.

Based on the setting position (the position in the Zc direction) of a virtual screen, the determination unit 18 further determines for each point forming an AR content whether the Zc coordinate value of the AR content transformed in the camera coordinate system exists behind the setting position of the virtual screen. This is because if an AR content has a positional relationship in which the AR content is in front of the virtual screen, the AR content is not projected on the virtual screen. For example, when the position at which the virtual screen is set is a position corresponding to N markers on the Zc axis, it is determined whether the Zc coordinate value is greater than N.

If all the determination results of the Xs coordinate value, the Ys coordinate value, and the Zc coordinate value are affirmative, the point of interest in the AR content will be displayed on a display when combined image data is displayed on the display. That is, it is determined that the point of interest is able to be displayed. Note that if it is determined that all the points forming AR content are able to be displayed on a display, the entire AR content will be displayed on the display.

If it is determined that only some of all the points forming AR content are able to be displayed on a display, that is, if the determination results of some of the points are affirmative whereas the determination results of the other of the points are negative, part of the AR content will be displayed on the display whereas another part of the AR content will not be displayed. Additionally, if it is determined that all the points are unable to be displayed on a display, that is, the determination results of all the points are negative, the AR content is not displayed on the display. In this embodiment, when the determination results of all the points are affirmative, the determination unit 18 determines that the AR content is able to be displayed. However, when the determination results of some of the points are affirmative whereas the determination results of the other points are negative, the determination unit 18 may determine that the AR content is able to be displayed.

Figure 13:
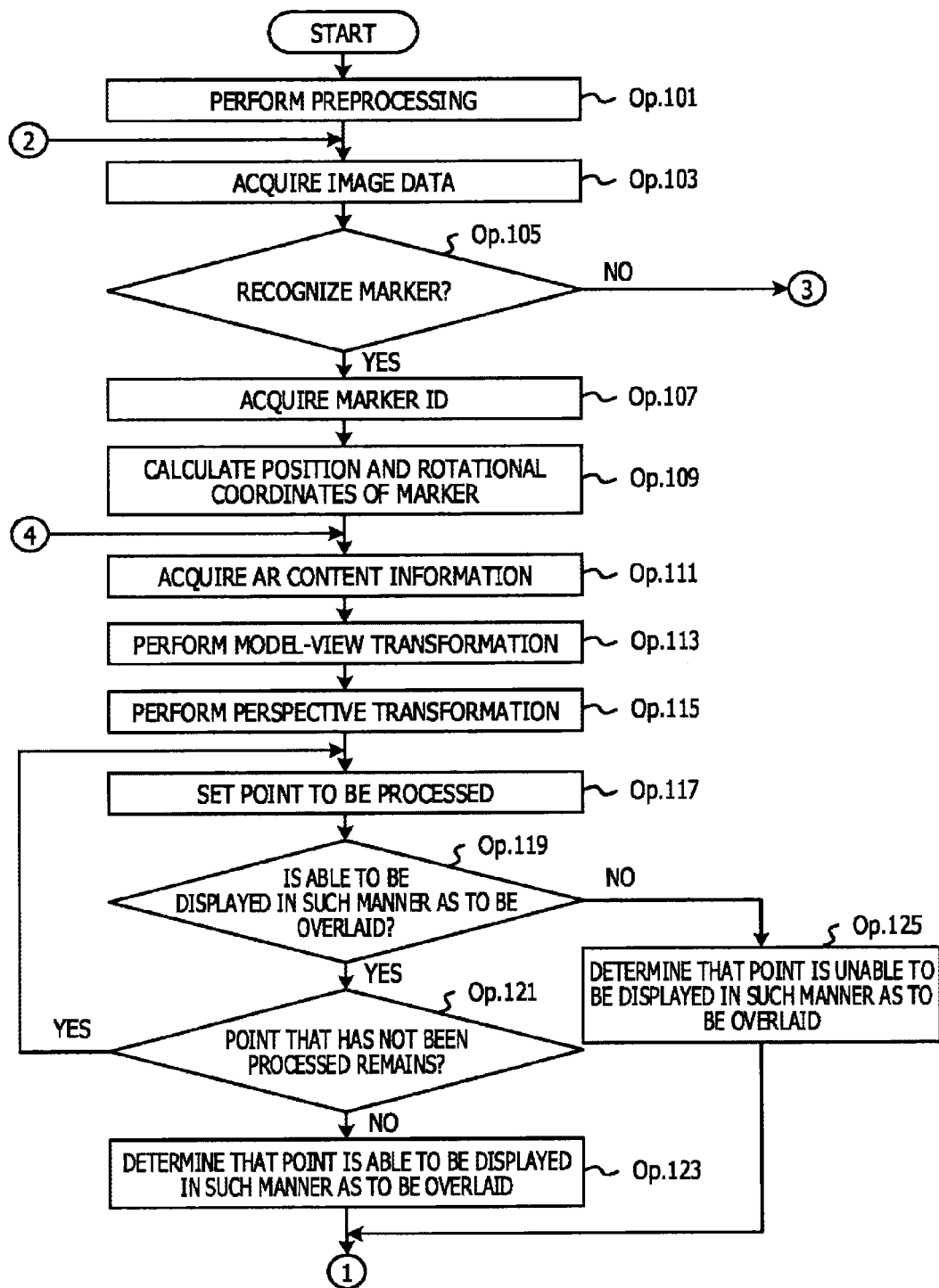
FIG. 13 is a flowchart (1) of a display control process according to a first embodiment.
Figure 14:
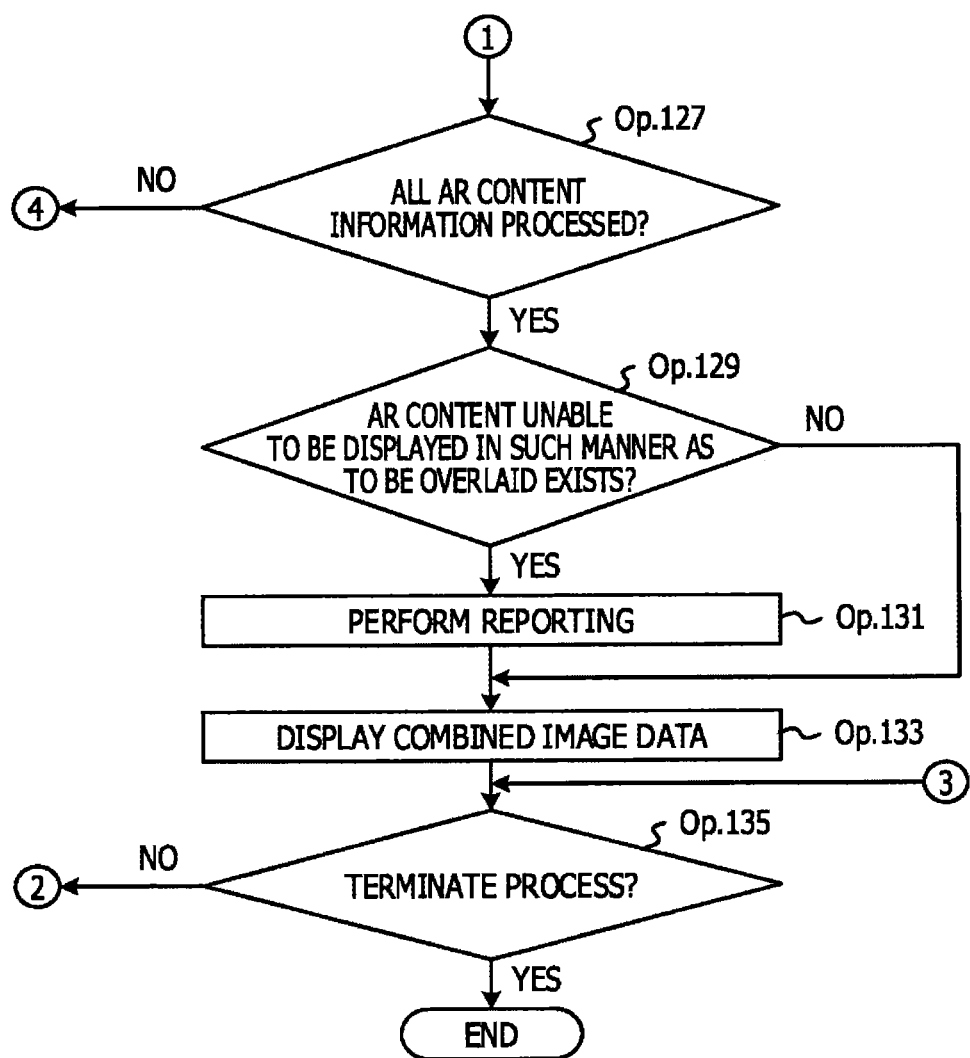
FIG. 14 is the flowchart (2) of the display control process according to the first embodiment.

Next, the flow of processing performed by the information processing device 10 will be described. FIG. 13 and FIG. 14 illustrate the process flow of a display control method. Note that the display control method is performed by a computer executing a display control program.

Upon start of the display control program, the control unit 15 performs preprocessing (Op. 101). In the operation of Op. 101, template information and AR content information are acquired from the management device 3. Additionally, the control unit 15 issues an instruction for activation of an AR display mode and, for example, causes the imaging unit 12 to start image capture at predetermined time intervals. The control unit 15 also causes the recognition unit 16 to start marker detection processing. When instructed from the control unit 15 to perform image capture, the imaging unit 12 acquires image data generated by an imaging device at predetermined time intervals, and stores the image data in the storage unit 14.

The storage unit 14 is provided with a buffer that stores plural pieces of image data, and the image data is stored in the buffer. For example, the buffer provided in the storage unit 14 is a display buffer in which image data to be displayed by the display unit 13 is stored. Image data stored in the display buffer is sequentially transferred to and displayed by the display unit 13. The control unit 15 also causes the display unit 13 to start displaying image data. Here, the display unit 13 displays, in real time, image data of an image captured by the imaging unit 12 and, as described below, displays combined image data if a marker is recognized.

The recognition unit 16 acquires image data stored in the buffer provided in the storage unit 14 (Op. 103). Then, the recognition unit 16 performs marker recognition on the acquired image data (Op. 105). If no marker is recognized, (No in Op. 105), the control unit 15 determines whether to terminate a display control process (Op. 135). If the display control process is to be terminated, (Yes in Op. 135), the control unit 15 terminates a series of display control process operations. For example, when input for terminating the display control process related to AR display is made by the user, the control unit 15 terminates the display control process. On the other hand, the display control process is not to be terminated (No in Op. 135), the control unit 15 repeats operations in and after Op. 103 for new image data.

On the other hand, if a marker is recognized (Yes in Op. 105), the recognition unit 16 reads the marker ID of the marker (Op. 107). Reading of the marker ID is performed, for example, based on information on the luminance within an image region corresponding to the marker. For example, in a case where the marker is quadrangular, for regions obtained by dividing a quadrangular image region recognized as the marker, a region having a luminance equal to or greater than a predetermined value is set to "1" and a region having a luminance less than the predetermined value is set to "0". Then, it is determined for each region in a predetermined order of regions whether the region is "1" or "0", and columns of information obtained by the determinations are set as marker IDs.

Additionally, for example, under the condition that arrangements in a quadrangular frame including regions each having a luminance equal to or greater than the predetermined value and regions each having a luminance less than the predetermined value are set as patterns, marker IDs corresponding to the patterns may be used. Further, if the numerical range assigned to a marker ID is determined in advance and the read marker ID is not within the numerical range, the recognition unit 16 may determine that the marker ID has not been read.

Next, the recognition unit 16 calculates the position and rotational coordinates of the marker in the camera coordinate system, based on the shape and size of the figure of the marker detected in the image data (Op. 109). For example, the recognition unit 16 extracts feature points corresponding to corners of the marker and, based on the positions of the four feature points in the image data, calculates position coordinates and rotational coordinates. Note that the recognition unit 16 outputs the calculated position and rotational coordinates and further the marker ID to the generation unit 17.

Using the marker ID acquired from the recognition unit 16 as the key, the generation unit 17 searches the data table storing AR content information. Then, the generation unit 17 acquires AR content information including the marker ID acquired from the recognition unit 16 (Op. 111). Further, using a template ID included in AR content information as the key, the corresponding template information is acquired from the data table storing template information.

The generation unit 17 generates the transformation matrix T by using the position and rotational coordinates acquired from the recognition unit 16 and then, by using the transformation matrix T, performs model-view transformation for each point defined in the AR content information and the template information (Op. 113). That is, the generation unit 17 transforms the coordinates of each point defined in the marker coordinate system to those in the camera coordinate system. The generation unit 17 further transforms the coordinates of each point expressed in the camera coordinate system to those in the screen coordinate system (Op. 115). That is, perspective transformation is performed.

Subsequently, the determination unit 18 sets a point to be processed among a plurality of points (the screen coordinate system) forming the figure of the AR content (Op. 117). Then, the determination unit 18 determines whether the point to be processed is within a displayable range of the display unit 13 (display) (Op. 119). That is, it is determined whether a portion of the point to be processed in the AR content is able to be displayed in such a manner as to be overlaid. During the determination, as described above, Zc in the camera coordinate system calculated before perspective transformation is utilized in addition to Xc and Ys in the screen coordinate system.

If the portion of the point to be processed in the AR content is able to be displayed in such a manner as to be overlaid (Yes in Op. 119), the determination unit 18 determines whether a point that has not been processed remains (Op. 121). If a point that has not been processed remains (Yes in Op. 121), the determination unit 18 sets a new point to be processed (Op. 117). On the other hand, if the portion is not able to be displayed in such a manner as to be overlaid (No in Op. 121), the determination unit 18 determines that the AR content including the point to be processed is unable to be displayed in such a manner as to be overlaid (Op. 125).

On the other hand, if no point that has not been processed remains (No in Op. 121), that is, if it is determined that all the points are able to be displayed in such a manner as to be overlaid, the determination unit 18 determines that the AR content is able to be displayed in such a manner as to be overlaid (Op. 123). In this embodiment, when it is determined that at least one point is unable to be displayed in such a manner as to be overlaid, it is determined that the AR content is unable to be displayed in such a manner as to be overlaid. However, when the operation of Op. 119 is performed for all the points, and a majority of points are unable to be displayed in such a manner as to be overlaid, the determination unit 18 may determine that the AR content in question is unable to be displayed in such a manner as to be overlaid. Additionally, an AR content may be identified given that AR contents are classified into three kinds: an AR content with all the points being able to be displayed in such a manner as to be overlaid, an AR content with some of the points being able to be displayed in such a manner as to be overlaid, and an AR content with all the points being unable to be displayed in such a manner as to be overlaid.

Next, the determination unit 18 determines whether the determination as to whether an AR content is able to be displayed in such a manner as to be overlaid has been performed for all the AR content information related to the marker ID (Op. 127). If AR content information that has not been processed and that corresponds to the marker ID exists (No in Op. 127), upon receipt of output of the determination result of the determination unit 18, each processing unit in the control unit 15 performs operations in and after Op. 111. For example, in a case where a plurality of AR contents are set for one marker, operations in and after Op. 111 are repeated using AR content information corresponding to each AR content.

Note that if a plurality of marker IDs are acquired in Op. 107, the recognition unit 16 calculates the position coordinates and the rotational coordinates of each marker in Op. 109. Also in such a case, using the position and rotational coordinates of each marker as the key, operations in and after Op. 111 are repeated for each of AR content information acquired using each marker ID as the key.

On the other hand, if all the AR content information has been processed (Yes in Op. 127), the determination unit 18 determines whether an AR content that is unable to be displayed in such a manner as to be overlaid exists (Op. 129). If an AR content that is unable to be displayed in such a manner as to be overlaid exists (Yes in Op. 129), the determination unit 18 performs report processing (Op. 131). For example, the display unit 13 is controlled, so that a warning message is displayed, or the voice output unit, which is not illustrated, is controlled, so that a sound of a warning message is output. Further, in cases where a camera (the imaging unit 12) has a zoom-less lens, upon receipt of a determination result issued by the determination unit 18, the control unit 15 controls the zoom-less lens of the camera. Thus, the camera may capture an image of wider angle.

After report processing is performed, or if AR content that is an unable to be displayed in such a manner as to be overlaid does not exist (No in Op. 129), the display unit 13 displays combined image data (Op. 133). Note that the display unit 13 displays combined image data under control of the generation unit 17. Specifically, the generation unit 17 generates image data of the figure of an AR content, based on the coordinate values of the AR content after perspective transformation and template information (texture information and the like). Then, the generated image data of the figure of AR content and the image data acquired from the imaging unit 12 are combined together and are output as combined image data to the display unit 13.

Then, under control of the generation unit 17, after the display unit 13 displays combined image data, the control unit 15 determines whether to terminate the process or not (Op. 135). If input for terminating the process is made (Yes in Op. 135), the control unit 15 terminates a series of display control process operations.

Figure 15:
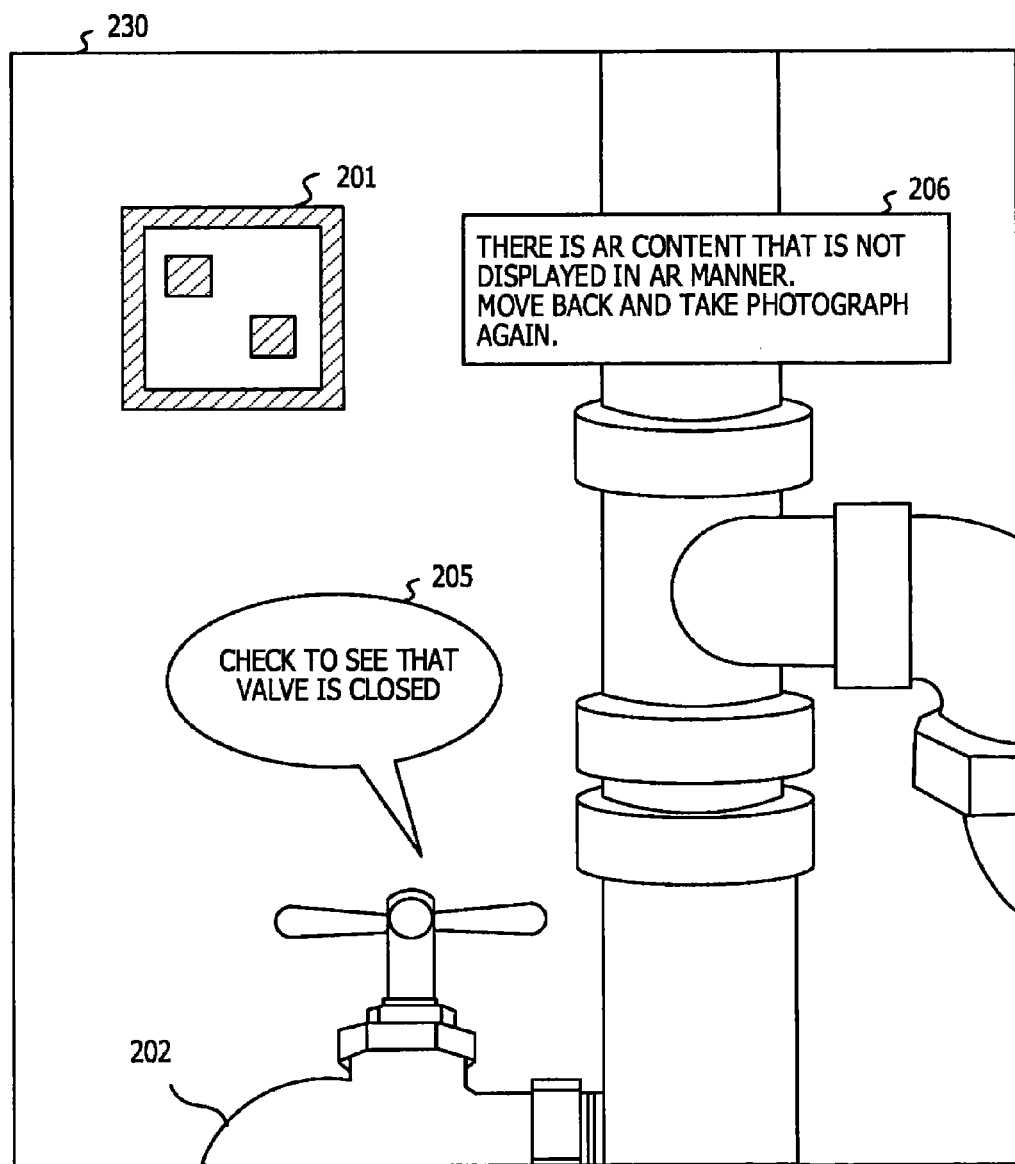
FIG. 15 is a conceptual illustration of a screen for reporting an AR content that is unable to be displayed in such a manner as to be overlaid.
Figure 16:
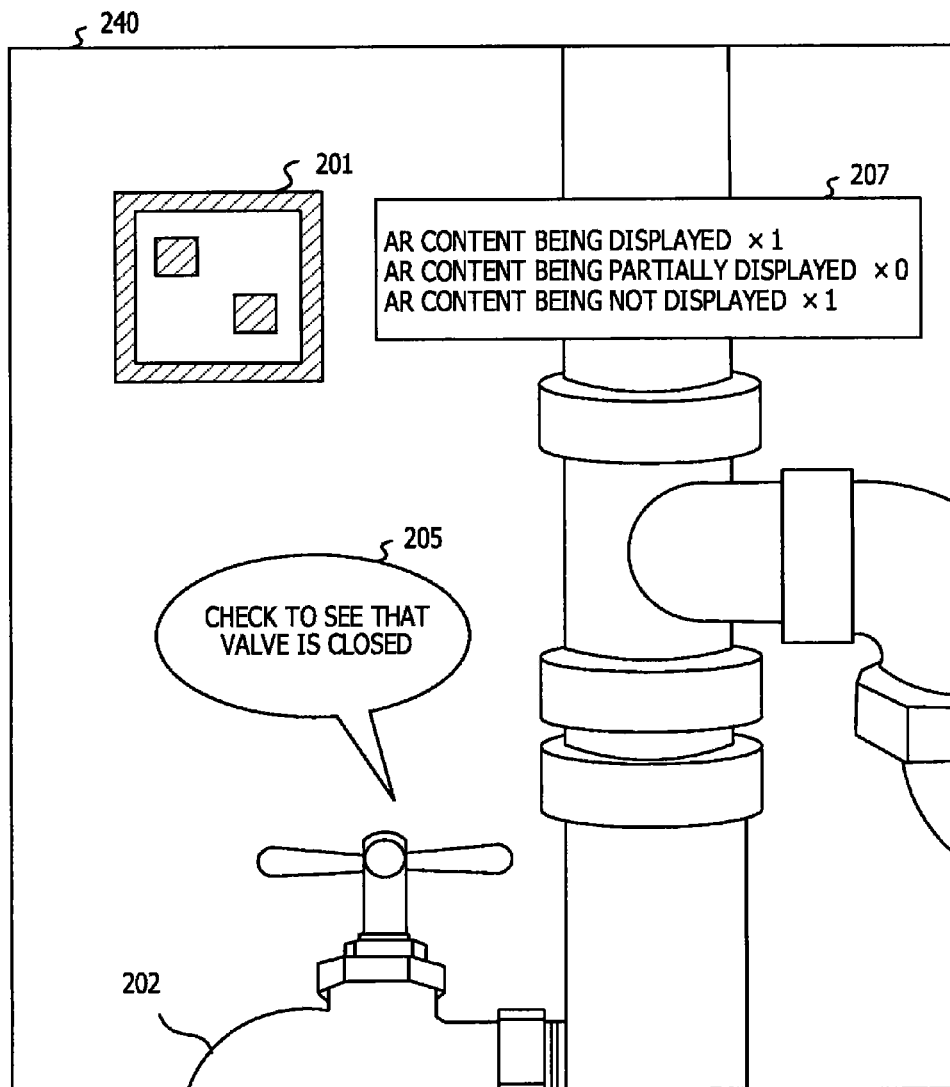
FIG. 16 is a conceptual illustration of another screen for reporting an AR content that is unable to be displayed in such a manner as to be overlaid.

FIG. 15 is a conceptual illustration of a screen for reporting an AR content that is unable to be displayed in such a manner as to be overlaid. FIG. 16 is a conceptual illustration of another screen for reporting an AR content that is unable to be displayed in such a manner as to be overlaid. In a screen 230 for reporting an AR content that is unable to be displayed in such a manner as to be overlaid, a warning message 206 for reporting the AR content that is unable to be displayed in such a manner as to be overlaid (the AR content 204 in FIG. 7) is displayed as well as the combined image 220 illustrated in FIG. 8. The warning message 206 saying "There is an AR content that is not displayed in an AR manner. Move back and take a photograph again." is information for reporting an AR content that is unable to be displayed in such a manner as to be overlaid. That is, the warning message 206 warns that although a plurality of AR contents, the AR content 204 and the AR content 205, are normally to be displayed in such a manner as to be overlaid as illustrated in the combined image 210 of FIG. 7, only the AR content 205 is displayed in such a manner as to be overlaid, and the AR content 204 is not displayed in such a manner as to be overlaid as in the combined image 220 of FIG. 8.

In contrast, in another screen 240 illustrated in FIG. 16, a warning message 207 for reporting the AR content that is unable to be displayed in such a manner as to be overlaid is displayed as well as the combined image 220 illustrated in FIG. 8. The warning message 207 saying "AR content being displayed×1, AR content being partially displayed×0, AR content being not displayed×1" is information for reporting an AR content that is unable to be displayed in such a manner as to be overlaid. In the example of FIG. 16, a warning message that allows the user to grasp the number of AR contents that are completely able to be displayed in such a manner as to be overlaid, the number of AR contents that are partially unable to be displayed in such a manner as to be overlaid, and the number of AR contents that are completely unable to be displayed in such a manner as to be overlaid.

Note that although the examples of FIG. 15 and FIG. 16 are examples of a screen in which the reporting operation in Op. 133 is performed together with the combined-image-data display operation (Op. 135), the reporting operation and the combined-image-data display operation may be independently performed.

As described above, if an AR content that is unable to be displayed in such a manner as to be overlaid exists, the information processing device 10 disclosed in this embodiment may report that fact to a user. Accordingly, the user can grasp the existence of an AR content that is not included in a combined image visually recognized on a display (the display unit 13). For example, the user who has received the report takes a measure, such as image capture of a marker from a farther distance, until reporting is stopped. This makes it possible for the user to visually recognize an AR content that has been unable to be displayed in such a manner as to be overlaid in a combined image.

Second Embodiment

In the first embodiment, AR content position information (the marker coordinate system) set in advance is transformed into coordinate values of the camera coordinate system and the screen coordinate system, and thereafter it is determined whether the AR content is able to be displayed in such a manner as to be overlaid on image data displayed on a display. In a second embodiment, using position coordinates (the marker coordinate system) set in advance for an AR content without any transformation, it is determined whether the AR content is able to be displayed in such a manner as to be overlaid on image data displayed on a display.

Figure 17:
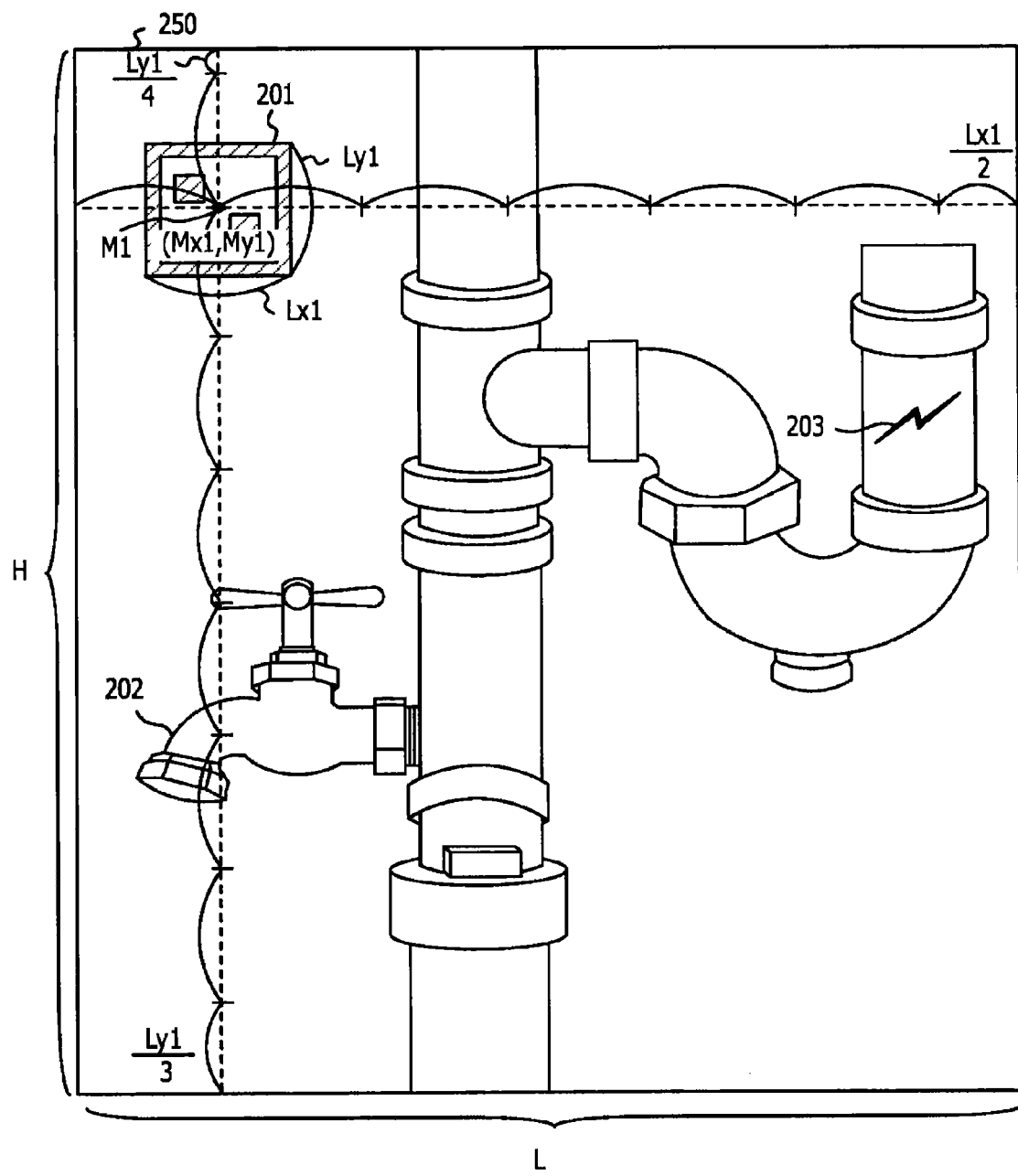
FIG. 17 is a conceptual illustration of a screen when an image captured by the user 110 is displayed on a display.
Figure 18:
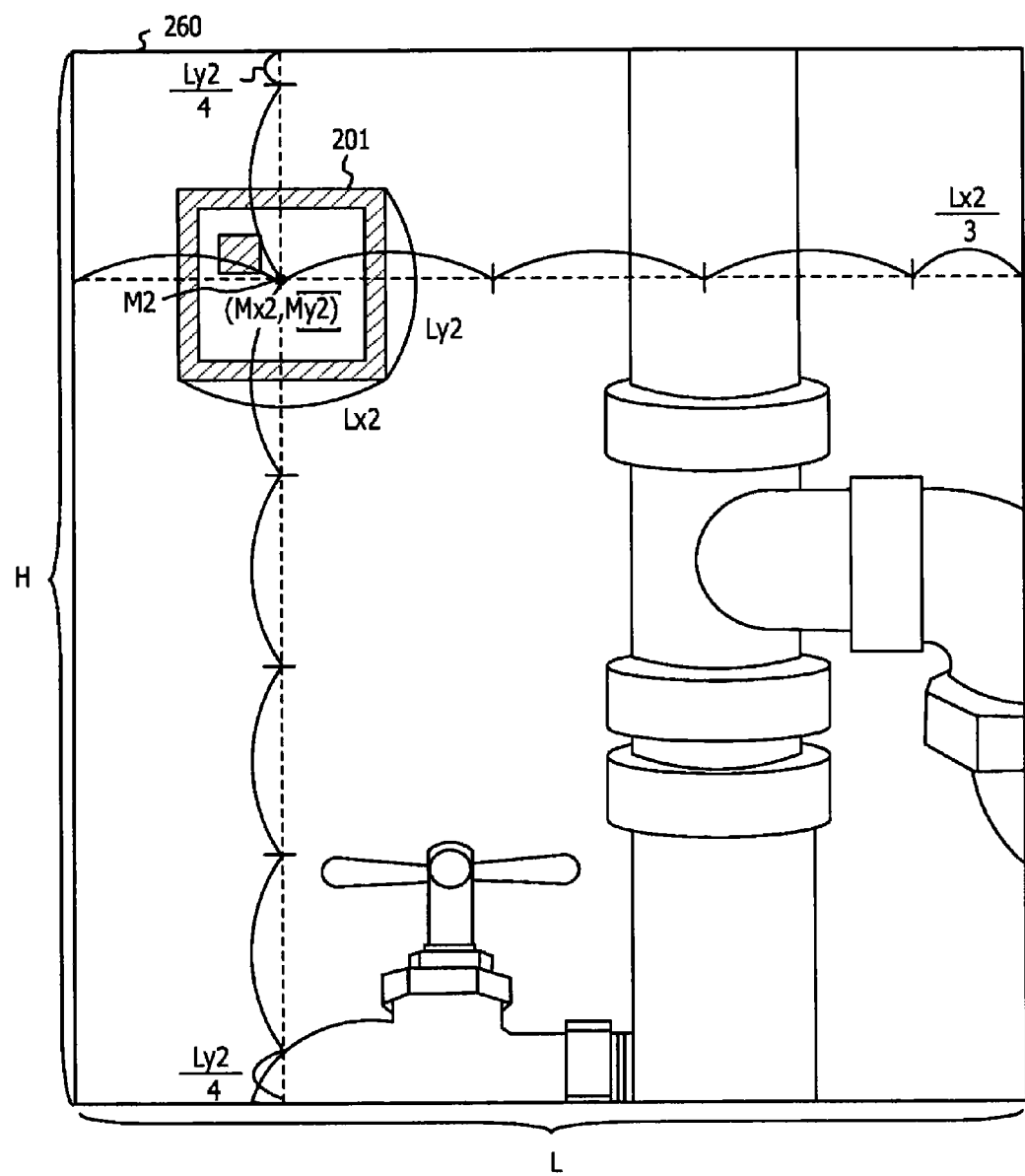
FIG. 18 is a conceptual illustration of a screen when an image captured by the user 120 is displayed on a display.

FIG. 17 and FIG. 18 are illustrations for explaining the overview of the second embodiment. FIG. 17 is a conceptual illustration of a screen when an image captured by the user 110 is displayed on a display. FIG. 18 is a conceptual illustration of a screen when an image captured by the user 120 is displayed on a display. Note that the user 110 and the user 120 correspond to the user 110 and the user 120 in FIG. 5 and FIG. 6. The display has a resolution of L×H as is the case in the first embodiment.

A marker 201 in an image 250 has a size with a width Lx1 and a length Ly1 from a position M1 (Mx1, My1), which is the center of the marker 201. Consequently, in the state of the image 250, the number of the markers 201 that are allowed to be displayed in the positive direction of the x-coordinate from the center (Mx1, My1) is (L−Mx1)/Lx1, which is calculated on the basis a unit corresponding to the width of one marker 201. Also in the state of the image 250, the number of the markers 201 that are allowed to be displayed in the negative direction of the x-coordinate from the center M1 (Mx1, My1) is Mx1/Lx1, which is calculated on the basis a unit corresponding to the width of one marker 201. In the positive direction of the y-coordinate from the center M1 (Mx1, My1), the number of the markers 201 that are allowed to be displayed is (H−My1)/Ly1, which is calculated on the basis a unit corresponding to the length of one marker 201, and the number of the markers 201 that are allowed to be displayed is My1/Ly1, which is calculated on the basis a unit corresponding to the length of one marker 201.

Here, as described above, the unit coordinates in the marker coordinate system corresponds to the size of one marker recognized from an image. That is, in the position coordinates (the marker coordinate system) set in advance for an AR content, if the Xm coordinate value is in a range of Mx1/Lx1 to (L−Mx1)/Lx1, and the Ym coordinate value is in a range of My1/Ly1 to (H−My1)/Ly1, the AR content is displayed in such a manner as to be overlaid on the display.

In the example of FIG. 17, an AR content for which the position coordinates are such that the Xm coordinate value is set to −1 to 5.5 and the Ym coordinate value is set to −6.3 to 1 is able to be displayed in such a manner as to be overlaid. Note that one graduation on the scale in FIG. 7 corresponds to one marker.

Additionally, in the example of FIG. 18, in the position coordinates (the marker coordinate system) set in advance for an AR content, if the Xm coordinate value is in a range of Mx2/Lx2 to (L−Mx2)/Lx2, and the Ym coordinate value is in a range of My2/Ly2 to (H−My2)/Ly2, the AR content is displayed in such a manner as to be overlaid on the image 250 displayed on the display. An AR content for which the position coordinates are such that the Xm coordinate value is set to −1 to 3.3 and the Ym coordinate value is set to −4.25 to 1.25 is able to be displayed in such a manner as to be overlaid.

The image 250 in FIG. 17 is an image from which the combined image 210 of FIG. 7 originates. If, for an AR content, in the marker coordinate system, the Xm coordinate value is set to a value of −1 to 5.5, and the Ym coordinate value is set to a value of −6.3 to 1, the AR content is displayed in such a manner as to be overlaid on the image 250. In contrast, an image 260 in FIG. 18 is an image from which the combined image 220 of FIG. 8 originates. If, for an AR content, the Xm coordinate value is set to a value of −1 to 3.3, and the Ym coordinate value is set to a value of −4.25 to 1.25, the AR content is displayed in such a manner as to be overlaid on the image 260. Consequently, the AR content 204 is displayed in such a manner as to be overlaid on the combined image 210 in FIG. 7, and the AR content 204 is not displayed in such a manner as to be overlaid on the combined image 220 in FIG. 8.

Figure 19:
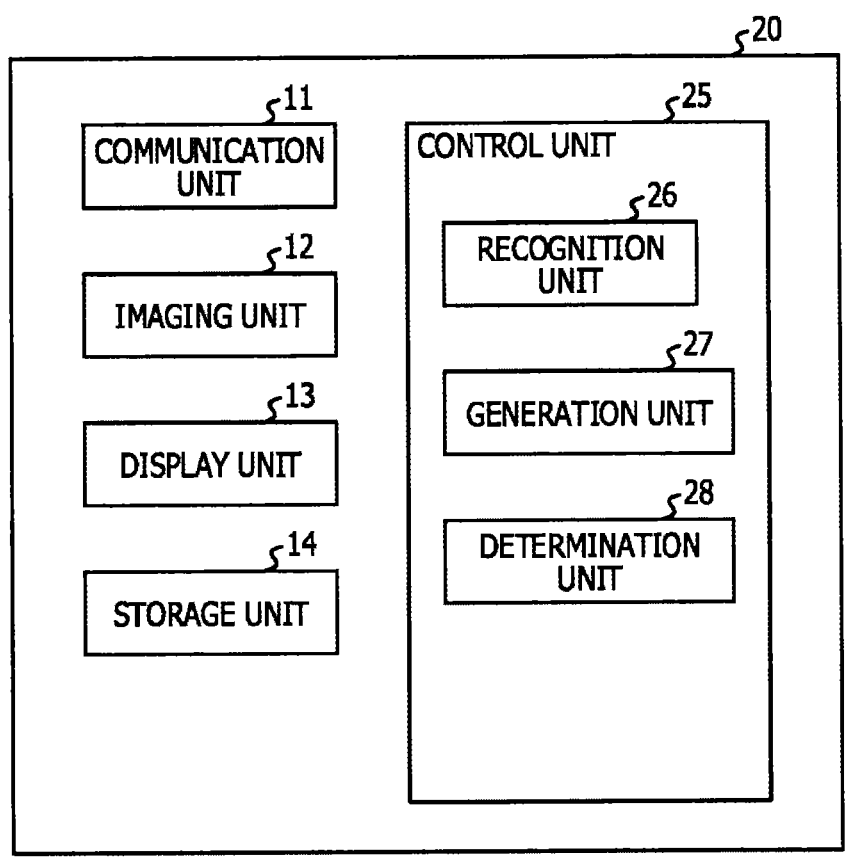
FIG. 19 is a functional block diagram of an information processing device 20 according to a second embodiment.

FIG. 19 is a functional block diagram of an information processing device 20 according to the second embodiment. The information processing device 20 includes the communication unit 11, the imaging unit 12, the display unit 13, the storage unit 14, and a control unit 25. Note that an example of the information processing device 1 is the information processing device 20 in the second embodiment. Note that processing units that perform the same processing as the processing units in the information processing device 10 according to the first embodiment are denoted by the same reference numerals, and redundant description thereof is omitted.

The control unit 25 controls processing of the entire information processing device 20. The control unit 25 includes a recognition unit 26, a generation unit 27, and a determination unit 28. Like the recognition unit 16 according to the first embodiment, the recognition unit 26 recognizes a marker and acquires the identification information (marker ID) of the marker. Additionally, like the recognition unit 16 according to the first embodiment, the recognition unit 26 calculates the position and rotational coordinates of the marker in the camera coordinate system, based on the figure of the marker in image data acquired from the imaging unit 12. Additionally, the recognition unit 26 acquires the length Lx, Ly (pixels) of each side of the marker and the coordinates (Mx, My) of the center point in the image of the marker, and outputs them to the determination unit 28.

The generation unit 27 generates a figure (image data) in order that an AR content determined by the determination unit 28 to be able to be displayed in such a manner as to be overlaid. Specifically, as in the first embodiment, the generation unit 27 acquires the position and rotational coordinates of a marker calculated by the recognition unit 26. Then, the generation unit 27 performs model-view transformation for the AR content that is able to be displayed in such a manner as to be overlaid, based on the transformation matrix T based on the position and rotational coordinates. The generation unit 27 further performs perspective transformation, and thus generates image data of the figure of the AR content and generates combined image data.

The determination unit 28 determines whether an AR content is able to be displayed in such a manner as to be overlaid on the image data, in response to a comparison between the position coordinates (marker coordinate system) and the displayable range calculated from the figure of the marker in the image data. Specifically, the approach described in conjunction with FIG. 17 and FIG. 18 is applied.

Additionally, the following approach, which is an improved version of the approach described in conjunction with FIG. 17 and FIG. 18, is applied. In conjunction with FIG. 17 and FIG. 18, the example of an image captured in such a situation that a camera and a marker face each other (hereinafter referred to as an "facing situation") has been described. However, when an image of a marker is captured in a situation other than the facing situation, each side of the maker in the image is rotated according to rotation matrices, and thereafter, in the same way as described above, the displayable range is compared with the position coordinates of the AR content.

Initially, assuming that an image is captured when the rotations around the Xc axis, the Yc axis, and the Zc axis are zero (in the facing situation), the determination unit 28 determines the length per side of a marker in this image by utilizing output from the recognition unit 26. Specifically, by substituting the length (Lx, Ly) of the marker in image data, the angle P1c of rotation around the Xc axis, and the angle Q1c of rotation around the Yc axis for Formula 3, the determination unit 28 calculates a length L of each side of a marker in the image captured when the camera and the marker face each other.

$$L = \cos P1c \times Lx = \cos Q1c \times Ly \quad \text{(Formula 3)}$$

In this embodiment, since a marker is square, the length per side of the marker is represented as L both in the Xs axis and Ys axis directions by assuming that the rotations around the Xc axis direction and around the Yc axis direction are zero. Additionally, a marker in the form of printed matter in which the marker is printed on paper or the like may be adopted. In this case, the value (thickness) in the Zc direction is sometimes zero. However, hereinafter, L determined by Formula 3 will also be used as the length of one side of a marker in the depth direction of an image.

Subsequently, the determination unit 28 decides a position at which an AR content is arranged in image data when an image of a marker is captured in the facing situation. Initially, the determination unit 28 calculates a shift amount in each axis in the marker coordinate system that is caused by transforming actually captured image data to image data obtained by capturing an image of a marker in the facing situation. Specifically, the shift amounts (Lx', Ly', Lz') in axial directions are determined using Formula 4 and the length L determined by Formula 3. Although Rx, Ry, Rz, and correspond to the determinants depicted in FIG. 20, P1c is the angle of rotation around the Xc axis, Q1c is the angle of rotation around the Yc axis, and R1c is the angle of rotation around the Zc axis.

$$(Lx', Ly', Lz', 1) = (Rx, Ry, Rz) \times T_L \quad \text{(Formula 4)}$$

Next, the determination unit 28 transforms the position information (Xm, Ym, Zm) saved as AR content information to (Xm', Ym', Zm') by using Formula 5. That is, by reflecting the shift amount in each axis direction determined by Formula 4 to the position information (Xm, Ym, Zm) of each AR content, the determination unit 28 decides a position at which each AR content is arranged in image data when an image of a marker is captured in a virtual facing situation.

$$(Xm', Ym', Zm', 1) = (Lx', Ly', Lz', 1) \times (Xm, Ym, Zm, 1) \quad \text{(Formula 5)}$$

Then, the determination unit 28 determines whether the Xm' coordinate value is in a range of Mx/Lx' to (L−Mx)/Lx', and the Ym' coordinate value is in a range of My1/Ly' to (H−My)/Ly'. The determination unit 28 further determines whether the AR content is set at a distance shorter than a distance at which a virtual display is set. For example, when the setting position of the virtual display is a distance corresponding to N markers, it is determined whether the Zm' coordinate is greater than (NxLZ'−Mz)/Lz'.

Referring to AR content information and template information, the determination 28 makes the above-mentioned determination for each point forming an AR content. Then, the determination unit 28 outputs, to the generation unit 27, a result of determination as to whether the AR content is able to be displayed in such a manner as to be overlaid. Note that, as in the first embodiment, the determination unit 28 may discriminate among an AR content with all the points being able to be displayed in such a manner as to be overlaid, an AR content with some of the points being able to be displayed in such a manner as to be overlaid, and an AR content with all the points being unable to be displayed in such a manner as to be overlaid.

Figure 21:
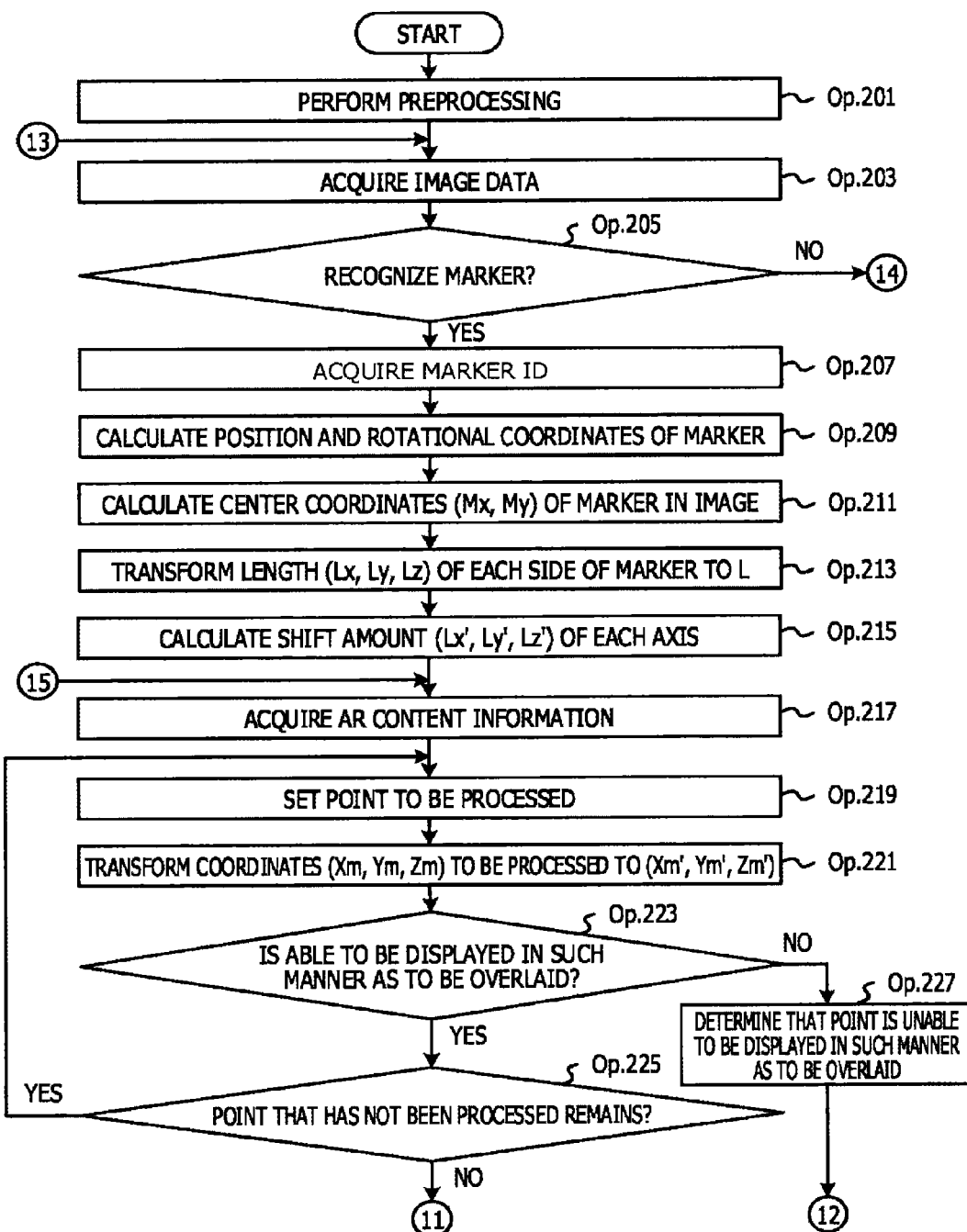
FIG. 21 is a flowchart (1) of a display control process according to the second embodiment.
Figure 22:
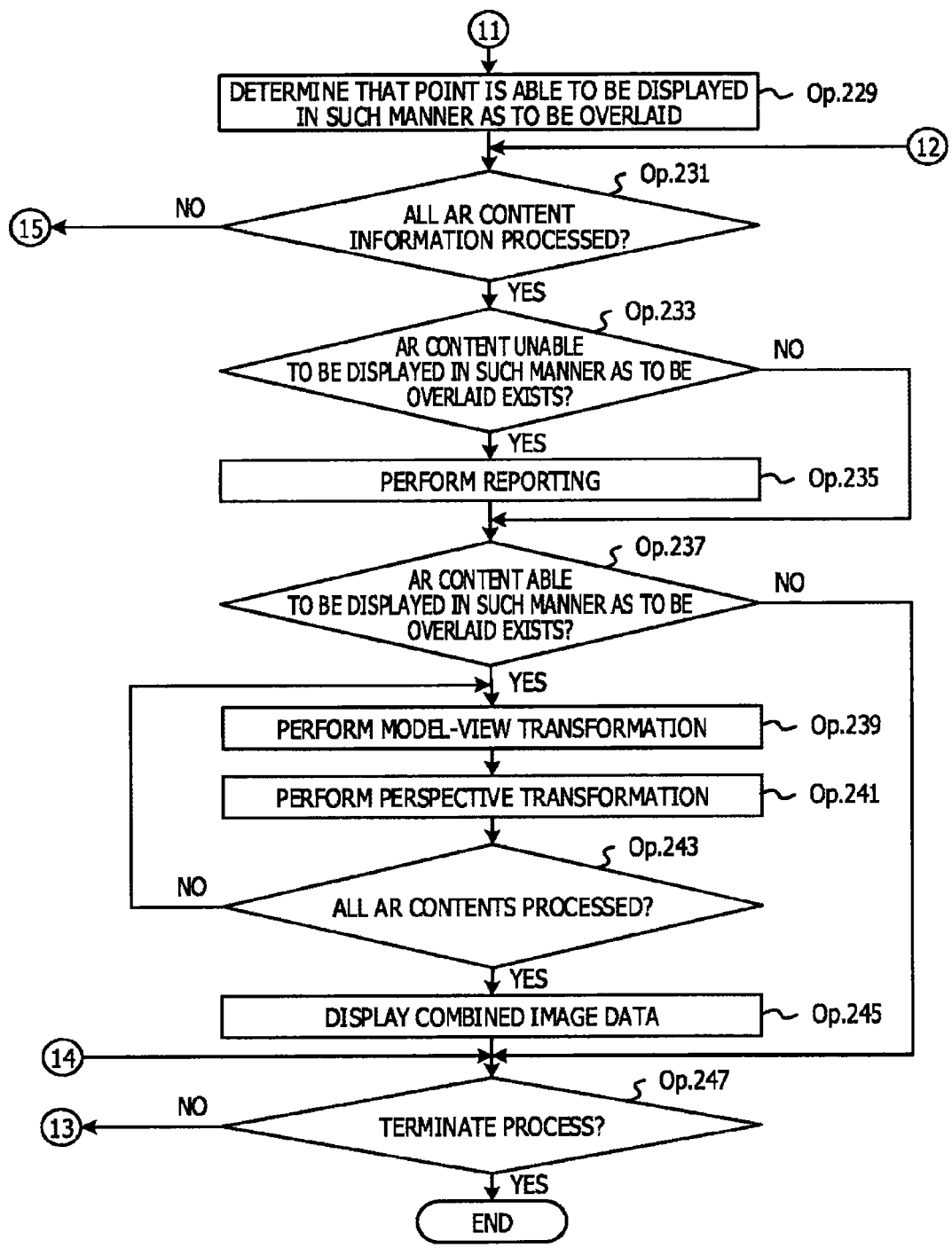
FIG. 22 is the flowchart (2) of the display control process according to the second embodiment.

Next, the flow of processing performed by the information processing device 20 will be described. FIG. 21 and FIG. 22 illustrate the process flow of a display control method according to the second embodiment. Note that the display control method is performed by a computer executing a display control program.

Upon start of the display control program, the control unit 25 performs preprocessing (Op. 201). The preprocessing according to the second embodiment is similar to the preprocessing (Op. 101) according to the first embodiment. Then, the recognition unit 26 acquires image data stored in the buffer provided in the storage unit 14 (Op. 203). Then, the recognition unit 26 performs marker recognition on the acquired image data (Op. 205) as in the first embodiment.

If a marker is not recognized, (No in Op. 205), the control unit 25 determines whether to terminate a display control process (Op. 247) as in Op 135 in the first embodiment. If the display control process is to be terminated, (Yes in Op. 247), the control unit 25 terminates a series of display control process operations. On the other hand, the display control process is not to be terminated (No in Op. 247), the control unit 25 returns to Op. 203 and repeats operations in and after Op. 203 for new image data.

On the other hand, if a marker is recognized (Yes in Op. 205), the recognition unit 26 performs reading of the marker ID of the marker (Op. 207) as in the first embodiment. Next, the recognition unit 26 calculates the position and rotational coordinates of the marker in the camera coordinate system, based on the shape and size of the figure of the marker detected in the image data (Op. 209) as in the first embodiment. The recognition unit 26 outputs the calculated position and rotational coordinates and further the marker ID to the determination unit 28.

The recognition unit 26 also calculates the center coordinates (Mx, My) of the marker in the image from the figure of the marker in image data (Op. 211). Further, the recognition unit 26 uses Formula 3 for the length (Lx, Ly, Lz) of each side of the marker in the image data, and thereby determines the length L of each side of the marker in image data when the image of the marker is captured in the facing situation (Op. 213). Then, the center coordinates (Mx, My) and the length L of each side of the marker are output to the determination unit 28.

Next, the determination unit 28 calculates the shift amount (Lx', Ly', Lz') of each axis utilizing the above-mentioned Formula 4 (Op. 215). Next, using the marker ID acquired from the recognition 26 as the key, the determination unit 28 acquires AR content information including the marker ID (Op. 217). Further, using a template ID included in the AR content information as the key, the corresponding template information is also acquired from a data table storing the template information.

Then, the determination unit 28 sets a point to be processed (Op. 219). Note that, here, for each point of an AR content, the determination unit 28 determines the position coordinates (Xm, Ym, Zm) of each point of the AR content, based on the position coordinates (the marker coordinate system) of a reference point defined in the AR content information and the template information. Then, any point of these points is set as a point to be processed.

Then, for the point to be processed, the determination unit 28 transforms the position coordinates (Xm, Ym, Zm) to position coordinates (Xm', Ym', Zm') utilizing Formula 5 (Op. 221). Using the position information (Xm', Ym', Zm'), the determination unit 28 determines whether the AR content is able to be displayed in such a manner as to be overlaid within the displayable range of the display (Op. 223).

Here, as described above, if the Xm' coordinate value is in a range of Mx/Lx' to (L−Mx)/Lx', the Ym' coordinate value is in a range of My1/Ly' to (H−My)/Ly', and the Zm' coordinate value is greater than (NxLz'−Mz)/Lz', it is determined that the point to be processed is displayable on the display.

If the portion of the point to be processed in the AR content is not able to be displayed in such a manner as to be overlaid (No in Op. 223), the determination unit 28 determines that the AR content including the point to be processed is unable to be displayed in such a manner as to be overlaid (Op. 227). On the other hand, if the portion of the point to be processed in the AR content is able to be displayed in such a manner as to be overlaid (Yes in Op. 223), the determination unit 28 determines whether a point that has not been processed remains (Op. 225). If a point that has not been processed remains (Yes in Op. 225), a new point to be processed is set (Op. 219).

if no point that has not been processed remains (No in Op. 225), that is, if it is determined that all the points are able to be displayed in such a manner as to be overlaid, the determination unit 28 determines that the AR content is able to be displayed in such a manner as to be overlaid (Op. 229). As in the first embodiment, an AR content with all the points being able to be displayed in such a manner as to be overlaid, an AR content with some of the points being able to be displayed in such a manner as to be overlaid, and an AR content with all the points being unable to be displayed in such a manner as to be overlaid may be discriminated as three kinds.

Next, the determination unit 28 determines whether the determination as to whether an AR content is able to be displayed in such a manner as to be overlaid has been performed for all the AR content information related to the marker ID acquired in Op. 207 (Op. 231). If all the AR content information has not been processed (No in Op. 231), the control unit 25 performs processing in and after Op. 217.

On the other hand, if all the AR content information has been processed (Yes in Op. 231), the determination unit 28 determines whether an AR content that is unable to be displayed in such a manner as to be overlaid exists (Op. 233). If an AR content that is unable to be displayed in such a manner as to be overlaid exists (Yes in Op. 233), the determination unit 28 performs report processing (Op. 235). For example, as in the first embodiment, the determination unit 28 controls the display unit 13 so as to display a warning message or controls a sound output unit, which is not illustrated, so as to output a sound of a warning message. For example, the displays illustrated in FIG. 15 and FIG. 16 are performed.

After report processing is performed, or if no AR content that is unable to be displayed in such a manner as to be overlaid exists (No in Op. 233), the generation unit 27 determines, based on a determination result acquired from the determination unit 28, whether an AR content that is able to be displayed in such a manner as to be overlaid exists (Op. 237). If an AR content that is able to be displayed in such a manner as to be overlaid exists (Yes in Op. 237), the generation unit 27 generates the transformation matrix T by using the position coordinates and rotational coordinates acquired from the recognition unit 26 via the determination unit 28, and performs model-view transformation for each point defined in the template information by using the transformation matrix T (Op. 239). The generation unit 27 further transforms the coordinates of each point expressed in the camera coordinate system to those in the screen coordinate system (Op. 241). Here, the generation unit 27 generates image data of the figure of the AR content, based on the coordinate values of the AR content after perspective transformation and the template information (texture information and the like).

Then, the generation unit 27 determines whether another AR content that is able to be displayed in such a manner as to be overlaid remains (Op. 243). If another AR content that is able to be displayed in such a manner as to be overlaid remains (No in Op. 243), the generation unit 27 performs operations in and after Op. 239, based on another AR content information. On the other hand, if another AR content that is able to be displayed in such a manner as to be overlaid does not remain (Yes in Op. 243), the display unit 13 displays combined image data (Op. 245). Then, after the combined image data is displayed, or it is determined in Op. 237 that no AR content that is able to be displayed in such a manner as to be overlaid exists (No in Op. 237), the control unit 25 determines whether to terminate the processing (Op. 247). If input for terminating processing is made (Yes in Op. 247), the control unit 25 terminates a series of display control process operations.

As described above, if an AR content that is unable to be displayed in such a manner as to be overlaid exists, the information processing device 20 disclosed in this embodiment may report that fact to the user. Accordingly, the user may grasp the existence of an AR content that is not included in a combined image visually recognized by himself or herself on a display (the display unit 13).

Moreover, the information processing device 20 according to the second embodiment identifies an AR content that is able to be displayed in such a manner as to be overlaid and thereafter, for the AR content that is able to be displayed in such a manner as to be overlaid, generates image data of a figure to be displayed as combined image data. Therefore, processing of model-view transformation and perspective transformation is performed only for an AR content determined as being able to be displayed in such a manner as to be overlaid. That is, compared to the first embodiment, the processing load is reduced in some cases.

[Examples of Hardware Configurations]

Figure 23:
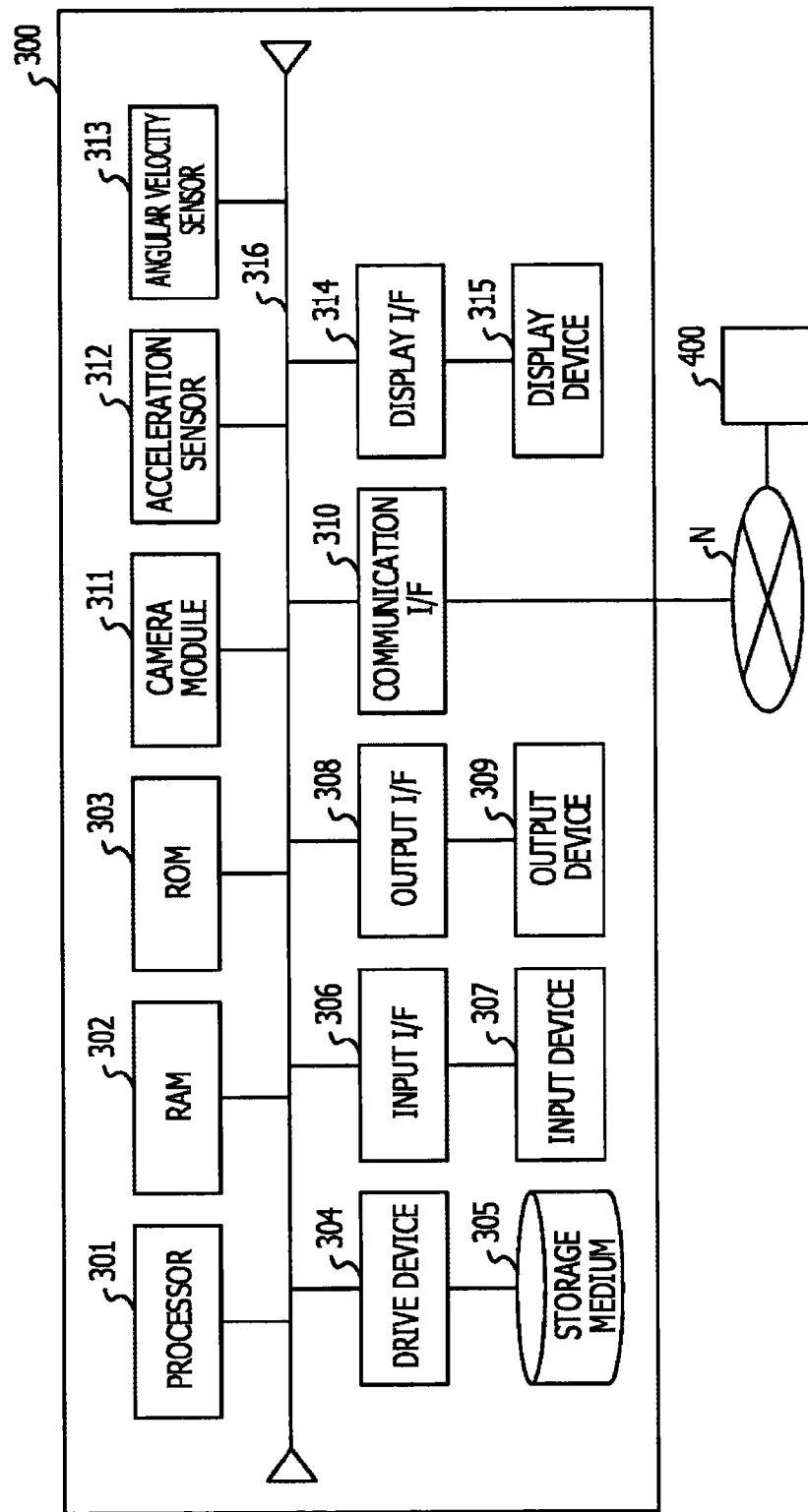
FIG. 23 illustrates an example of a hardware configuration of the information processing device of each of the embodiments.

The hardware configurations of the information processing device 1 and the management device 3 illustrated in each of the embodiments will be described. FIG. 23 illustrates an example of a hardware configuration of the information processing device of each of the embodiments. The information processing devices 1 (the information processing device 10 and the information processing device 20) in the embodiments are each implemented by a computer 300. The functional blocks illustrated in FIG. 10 and FIG. 19 are implemented, for example, by the hardware configuration illustrated in FIG. 23. The computer 300 includes, for example, a processor 301, a random access memory (RAM) 302, a read only memory (ROM) 303, a drive device 304, a storage medium 305, an input interface (input I/F) 306, an input device 307, an output interface (output I/F) 308, an output device 309, a communication interface (communication I/F) 310, a camera module 311, an acceleration sensor 312, an angular velocity sensor 313, a display interface 314, a display device 315, a bus 316, and so on. The hardware components are each connected through the bus 316.

The communication interface 310 controls communication over the network N. Communication controlled by the communication interface 310 may be in a manner of accessing the network N through a wireless base station utilizing wireless communication. An example of the communication interface 310 is a network interface card (NIC). The input interface 306 is connected to the input device 307, and transmits an input signal received from the input device 307 to the processor 301. The output interface 308 is connected to the output device 309 and causes the output device 309 to perform output in accordance with an instruction of the processor 301. An example of the input interface 306 and the output interface 308 is an input/output (I/O) controller.

The input device 307 is a device that transmits an input signal in response to an operation. The input device 307 is, for example, a key device, such as a keyboard or a button attached to the main body of the computer 300, or a pointing device such as a mouse or a touch panel. The output device 309 is a device that outputs information in accordance with control of the processor 301. The output device 309 is, for example, a sound output device, such as a speaker.

The display interface 314 is coupled to the display device 315. The display interface 314 causes the display device 315 to display image information that is written to a display buffer provided in the display interface 314 by the processor 301. An example of the display interface 314 is a graphic card or a graphic chip. The display device 315 is a device that outputs information in accordance with control of the processor 301. As the display device 315, an image output device such as a display, a transmissive display, or the like is used.

In the case where a transmissive display is used, a projection image of an AR content may be, for example, controlled to be displayed at a suitable position in the transmissive display rather than to be combined with a captured image. This allows the user to obtain visual perception of a state in which the real space and AR content coincide with each other. Additionally, for example, an input-output device, such as a touch screen, is used as the input device 307 as well as the display device 315. Additionally, instead of the input device 307 as well as the display device 315 integrated inside the computer 300, the input device 307 as well as the display device 315 may be coupled to the computer 300 from outside thereof, for example.

The RAM 302 is a readable and writable memory device, and a semiconductor memory such as a static RAM (SRAM) or a dynamic RAM (DRAM), or a flash memory other than the RAM, for example, may be used. Examples of the ROM 303 include a programmable ROM (PROM) and so on.

The drive device 304 is a device that performs at least either of reading and writing of information stored in the storage medium 305. The storage medium 305 stores information written by the drive device 304. The storage medium 305 is, for example, at least one of kinds of storage media, such as a hard disk, a solid state drive (SSD), a compact disc (CD), a digital versatile disc (DVD), and a blu-ray disc. Additionally, for example, the computer 300 includes the drive device 304 corresponding to the kind of the storage medium 305 in the computer 300.

The camera module 311 includes an imaging device (image sensor), and, for example, writes data obtained through opto-electric conversion by the imaging device to an input-image image buffer included in the camera module 311. The acceleration sensor 312 measures an acceleration that acts on the acceleration sensor 312. The angular velocity sensor 313 measures an angular velocity of an operation performed by the angular velocity sensor 313.

The processor 301 reads a program stored in the ROM 303 or the storage medium 305 to the RAM 302 and performs processing according to the procedure of the read program. For example, the functions of the control unit 15 are implemented by the processor 301 controlling other hardware components based on the display control program defining operations illustrated in FIG. 13 and FIG. 14. Additionally, for example, the functions of the control unit 25 are implemented by the processor 301 controlling other hardware components based on the display control program defining operations illustrated in FIG. 21 and FIG. 22.

The functions of the communication unit 11 are implemented by the processor 301 controlling the communication interface 310 to perform data communication and to store received data in the storage medium 305. The functions of the imaging unit 12 are implemented by the camera module 311 writing image data to the input-image image buffer and by the processor 301 reading image data in the input-image image buffer. In a monitoring mode, for example, image data is written to the input-image image buffer and is concurrently written to a display buffer of the display device 315.

Additionally, the functions of the display unit 13 are implemented when image data generated by the processor 301 is written to the display buffer included in the display interface 314 and the display device 315 displays image data in the display buffer. The functions of the storage unit 14 are implemented by the ROM 303 and the storage medium 305 storing a program file and a data file or by the RAM 302 being used as a work area of the processor 301. For example, AR content information, template information, and so on are stored in the RAM 302.

Figure 24:
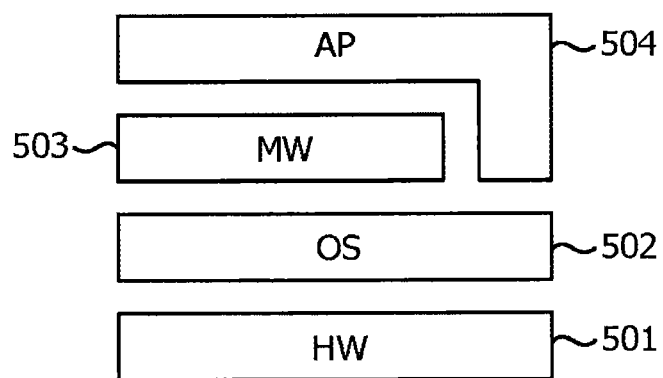
FIG. 24 illustrates an example of a configuration of programs that operate on a computer.

Next, FIG. 24 illustrates an example of a configuration of programs that operate on the computer 300. On the computer 300, an operating system (OS) 502 that controls a hardware group operates. The processor 301 operates in a procedure in accordance with the OS 502 to perform control and management of hardware (HW) 501, so that processing by an application program (AP) 504 or middleware (MW) 503 is performed on the HW 501.

On the computer 300, programs such as the OS 502, the MW 503, and the AP 504 are, for example, read to the RAM 302 and are executed by the processor 301. Additionally, the display control program illustrated in each embodiment is, for example, a program activated as the MW 503 from the AP 504.

Alternatively, for example, the display control program is a program that implements the AR functions as the AP 504. The display control program is stored in the storage medium 305. The storage medium 305 in which the display control program according to the present embodiments is singly stored or in which the display control program including other programs is stored may be circulated separately from the main body of the computer 300.

Figure 25:
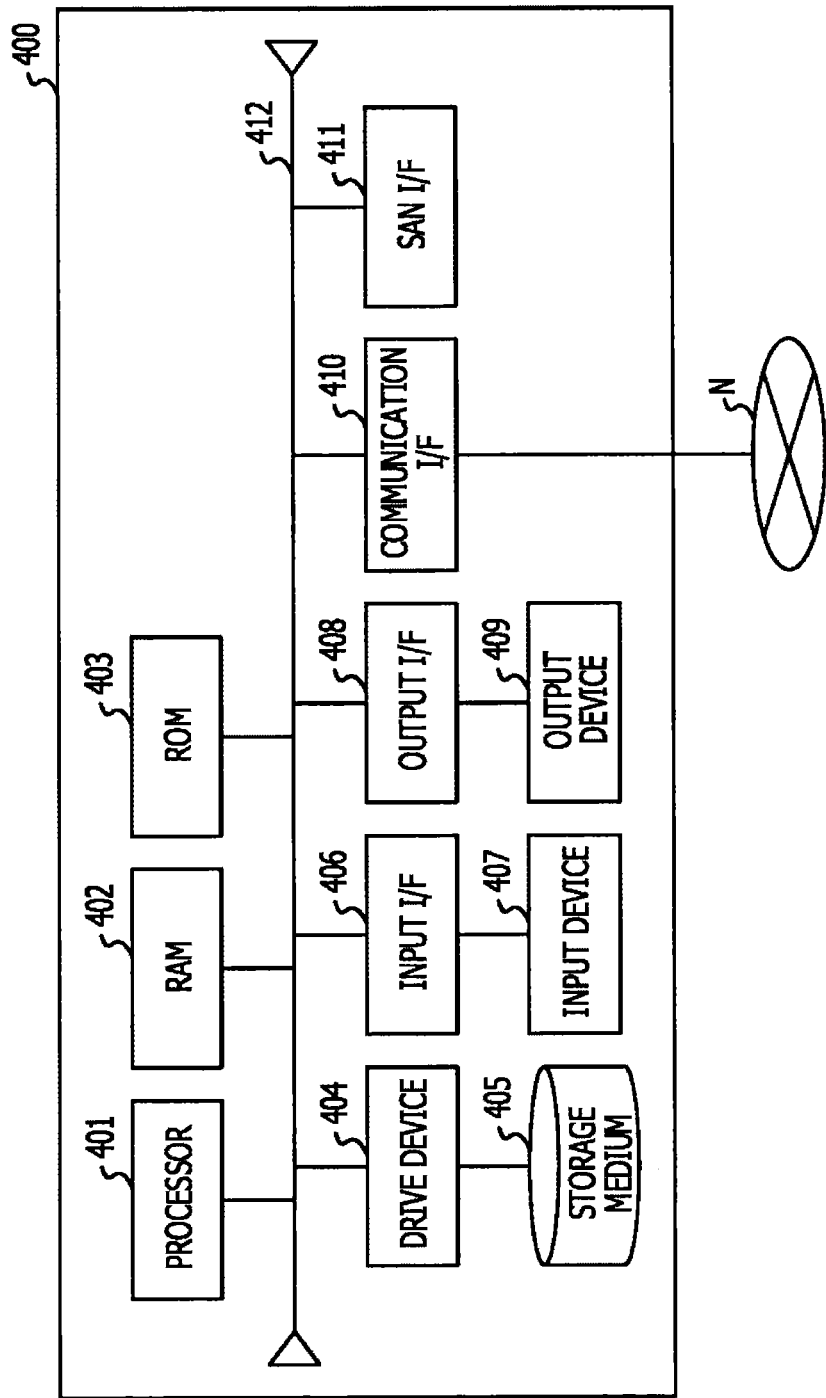
FIG. 25 is an example of a hardware configuration of a management device.

Next, a hardware configuration of the management device 3 in each of the embodiments will be described. FIG. 25 is an example of a hardware configuration of the management device 3. The management device 3 is implemented by a computer 400. The management device 3 is implemented by the hardware configuration illustrated in FIG. 25.

The computer 400 includes, for example, a processor 401, a RAM 402, a ROM 403, a drive device 404, a storage medium 405, an input interface (input I/F) 406, an input device 407, an output interface (output I/F) 408, an output device 409, a communication interface (communication I/F) 410, a storage area network (SAN) interface (SAN I/F) 411, a bus 412, and so on. Each hardware component is coupled through the bus 412.

For example, the processor 401 is hardware similar to the processor 301. The RAM 402 is, for example, hardware similar to the RAM 302. The ROM 403 is, for example, hardware similar to the ROM 303. The drive device 404 is, for example, hardware similar to the drive device 304. The storage medium 405 is, for example, hardware similar to the storage medium 305. The input interface (input I/F) 406 is, for example, hardware similar to the input interface 306. The input device 407 is, for example, hardware similar to the input device 307.

The output interface (output I/F) 408 is, for example, hardware similar to the output interface 308. The output device 409 is, for example, hardware similar to the output device 309. The communication interface (communication I/F) 410 is, for example, hardware similar to the communication interface 310. The storage interface network (SAN) 411 is an interface for connecting the computer 400 to the SAN and includes a host bus adapter (HBA).

The processor 401 reads a management program stored in the ROM 403 or the storage medium 405 to the RAM 402 and performs processing according to the procedure of the read management program. At that point, the RAM 402 is used as a work area of the processor 401. Note that the management program is a program according to the management functions of the management device 3 and includes the display control program according to each of the embodiments when display control is performed on the side of the management device 3.

The ROM 403 and the storage medium 405 store a program file and a data file, or the RAM 402 is used as a work area of the processor 401, so that the management device 3 stores various kinds of information. Additionally, the processor 401 controls the communication interface 410 to perform communication processing.

MODIFICATION

In another aspect in the disclosed embodiments, a projection image of the AR content C may be displayed on a transmissive display. Also in this aspect, a figure in the real space obtained through the display by the user and a projection image of an AR content coincide with each other. Thus, visual information offered to the user is augmented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
circuitry configured to:
acquire image data captured by an electronic device,
acquire content and display position information corresponding to the content based on an object detected in the image data, the display position information indicating a display position of the content in relation to the object,
determine whether the content is capable of being displayed in a superimposed manner on the image data at the display position indicated by the display position information, and
indicate an alert to be output by the electronic device when the circuitry determines that the content is unable to be displayed at the display position indicated by the display position information,
wherein the content is unable to be displayed corresponds to when the display position of the content is provided outside of the image data, and
wherein the alert includes information indicating a quantity of a plurality of content items that are not capable of being displayed when the circuitry determines that at least one of the plurality of content items is not capable of being displayed.

2. The system according to claim 1, wherein the circuitry is configured to determine a positional relationship between the object and the electronic device based on the object detected in the image data.

3. The system according to claim 2, wherein the circuitry is configured to identify the display position of the content based on the positional relationship and the display position information.

4. The system according to claim 3, wherein the circuitry is configured to determine whether the content is capable of being displayed based on the display position of the content and a display range of a display.

5. The system according to claim 1, wherein the display position information is set based on a unit amount corresponding to a size of the object detected in the image data.

6. The system according to claim 5, wherein the circuitry is configured to transform a displayable range of a display to another displayable range based on the unit amount and the size of the object detected in the image data.

7. The system according to claim 6, wherein the circuitry is configured to determine whether the content is capable of being displayed based on the display position and the another displayable range.

8. The system according to claim 1, wherein the alert corresponds to an instruction for a user to change a position of the electronic device in real space.

9. The system according to claim 8, wherein the alert instructs the user to move the electronic device further away from the object.

10. The system according to claim 1, wherein the circuitry is configured to acquire the plurality of content items and display position information corresponding to each of the plurality of content items based on the object detected in the image data.

11. The system according to claim 10, wherein the circuitry is configured to determine whether each of the plurality of content items are capable of being displayed in a superimposed manner on the image data at display positions indicated by the display position information.

12. The system according to claim 1, wherein the content includes information indicating a task corresponding to the object detected in the image data that is to be performed.

13. The system according to claim 1, wherein the object detected in the image data is a marker having at least one of a specific shape or pattern.

14. The system according to claim 1, further comprising:
the electronic device, wherein the electronic device includes
an image pickup device configured to capture the image data; and
a communication interface configured to send the image data to the system via a network and receive the alert from the system via the network.

15. The system according to claim 1, further comprising:
the electronic device, wherein the electronic device includes a display configured to display at least one of the content, the image data, and the alert.

16. The system according to claim 1, wherein the system is a server.

17. The system according to claim 16, wherein the server includes
the circuitry; and
a communication interface configured to receive the image data from the electronic device via a network and transmit the alert to the electronic device via the network.

18. A non-transitory computer-readable medium including computer-program instructions, which when executed by a system cause the system to:
acquire image data captured by an electronic device;
acquire content and display position information corresponding to the content based on an object detected in the image data, the display position information indicating a display position of the content in relation to the object;
determine whether the content is capable of being displayed in a superimposed manner on the image data at the display position indicated by the display position information; and
indicate an alert to be output by the electronic device when the determining determines that the content is unable to be displayed at the display position indicated by the display position information,
wherein the content is unable to be displayed corresponds to when the display position of the content is provided outside of the image data, and
wherein the alert includes information indicating a quantity of a plurality of content items that are not capable of being displayed when the determining determines that at least one of the plurality of content items is not capable of being displayed.

19. A method executed by a system, the method comprising:
acquiring image data captured by an electronic device;
acquiring content and display position information corresponding to the content based on an object detected in the image data, the display position information indicating a display position of the content in relation to the object;
determining, by circuitry, whether the content is capable of being displayed in a superimposed manner on the image data at the display position indicated by the display position information; and
indicating an alert to be output by the electronic device when the determining determines that the content is unable to be displayed at the display position indicated by the display position information,
wherein the content is unable to be displayed corresponds to when the display position of the content is provided outside of the image data, and
wherein the alert includes information indicating a quantity of a plurality of content items that are not capable of being displayed when the determining determines that at least one of the plurality of content items is not capable of being displayed.

* * * * *